US008709972B2

(12) United States Patent
Istvan et al.

(10) Patent No.: US 8,709,972 B2
(45) Date of Patent: Apr. 29, 2014

(54) METHODS OF FORMING ACTIVATED CARBONS

(75) Inventors: Rudyard Lyle Istvan, Fort Lauderdale, FL (US); Stephen M. Lipka, Nicholasville, KY (US); Christopher Ray Swartz, Lexington, KY (US)

(73) Assignee: Nanocarbons LLC, Fort Lauderdale, FL (US)

( * ) Notice: Subject to any disclaimer, the term of this patent is extended or adjusted under 35 U.S.C. 154(b) by 712 days.

(21) Appl. No.: 12/070,062

(22) Filed: Feb. 14, 2008

(65) Prior Publication Data

US 2008/0254972 A1    Oct. 16, 2008

Related U.S. Application Data

(60) Provisional application No. 60/901,850, filed on Feb. 14, 2007, provisional application No. 60/961,432, filed on Jul. 20, 2007, provisional application No. 60/961,320, filed on Jul. 20, 2007, provisional application No. 61/005,587, filed on Dec. 6, 2007.

(51) Int. Cl.
 C01B 31/12    (2006.01)
(52) U.S. Cl.
 USPC ............................. 502/425; 502/423
(58) Field of Classification Search
 USPC ................................ 502/425, 423
 See application file for complete search history.

(56) References Cited

U.S. PATENT DOCUMENTS

| | | | |
|---|---|---|---|
| 3,288,641 A | | 11/1966 | Ewe et al. |
| 4,264,320 A | * | 4/1981 | White .............................. 8/194 |
| 4,412,937 A | * | 11/1983 | Ikegami et al. ............... 502/423 |
| 4,439,349 A | | 3/1984 | Everett et al. |
| 4,460,650 A | | 7/1984 | Ogawa et al. |
| 4,552,750 A | | 11/1985 | van der Wal et al. |
| 4,565,727 A | | 1/1986 | Giglia et al. |
| 4,704,196 A | | 11/1987 | Saito et al. |
| 4,731,705 A | | 3/1988 | Velasco et al. |
| 5,041,195 A | | 8/1991 | Taylor et al. |
| 5,102,855 A | * | 4/1992 | Greinke et al. ............... 502/425 |
| 5,202,302 A | * | 4/1993 | De La Pena et al. .......... 502/425 |
| 5,242,879 A | | 9/1993 | Abe et al. |
| 5,482,906 A | | 1/1996 | Sakai et al. |
| 5,488,023 A | | 1/1996 | Gadkaree et al. |
| 5,626,977 A | | 5/1997 | Mayer et al. |
| 5,706,165 A | | 1/1998 | Saito et al. |
| 5,776,633 A | | 7/1998 | Mrotek et al. |
| 5,877,935 A | | 3/1999 | Sato et al. |
| 5,898,564 A | | 4/1999 | Mayer et al. |
| 5,907,471 A | | 5/1999 | Patel et al. |
| 5,922,300 A | | 7/1999 | Nakajima et al. |
| 5,951,959 A | | 9/1999 | Nishimura |
| 5,956,225 A | | 9/1999 | Okuyama et al. |
| 5,963,417 A | | 10/1999 | Anderson et al. |
| 5,990,041 A | | 11/1999 | Chung et al. |
| 5,997,829 A | * | 12/1999 | Sekine et al. ................. 423/210 |
| 6,024,899 A | | 2/2000 | Peng et al. |
| 6,060,424 A | * | 5/2000 | Alford .......................... 502/416 |
| 6,080,504 A | | 6/2000 | Taylor et al. |
| 6,103,373 A | | 8/2000 | Nishimura et al. |
| 6,183,189 B1 | | 2/2001 | Lzu et al. |
| 6,205,016 B1 | | 3/2001 | Niu |
| 6,228,803 B1 | | 5/2001 | Gadkaree et al. |
| 6,248,691 B1 | | 6/2001 | Gadkaree et al. |
| 6,288,888 B1 | | 9/2001 | Sakata et al. |
| 6,297,293 B1 | | 10/2001 | Bell et al. |
| 6,451,073 B1 | | 9/2002 | Farahmandi et al. |
| 6,491,789 B2 | | 12/2002 | Niu |
| 6,503,382 B1 | | 1/2003 | Bartlett et al. |
| 6,616,435 B2 | | 9/2003 | Lee et al. |
| 6,627,252 B1 | | 9/2003 | Nanjundiah et al. |
| 6,631,073 B1 | | 10/2003 | Sakata et al. |
| 6,631,074 B2 | | 10/2003 | Bendale et al. |
| 6,643,119 B2 | | 11/2003 | Nanjundiah et al. |
| 6,660,583 B2 | | 12/2003 | Fujino et al. |
| 6,673,328 B1 | | 1/2004 | Klett et al. |
| 6,697,249 B2 | | 2/2004 | Maletin et al. |

(Continued)

FOREIGN PATENT DOCUMENTS

| | | |
|---|---|---|
| CN | 1760414 A | 4/2006 |
| EP | 0742295 A2 | 11/1996 |

(Continued)

OTHER PUBLICATIONS

2005 Annual Progress Report: Energy Storage Research and Development (U.S. Department of Energy, Jan. 2006).

Imre Gyuk (manager of the Energy Storage Research Program, DOE), *Utility Scale Electricity Storage,*(speaker 4, slides 13-15, Advanced Capacitors World Summit 2006).

H. Shi, *Activated Carbons and Double Layer Capacitance*, 41(10) Electrochimica Acta 1633, 1633-1639 (Elsevier Science Ltd. 1996).

(Continued)

*Primary Examiner* — Stuart Hendrickson
(74) *Attorney, Agent, or Firm* — Brinks Gilson & Lione

(57) ABSTRACT

Enhanced methods for preparing activated carbons have been discovered. In order to form an activated carbon, a carbon precursor material is coated with a phosphorus based chemical solution and physically activated. An activated carbon may also be formed by coating a green carbon precursor with a chemical solution that chemically reacts with carbon, carbonizing the resulting material, and physically activating the material during at least a portion of the carbonizing step. An activated carbon may also be formed by milling a carbon material to a predetermined particle size, then activating the milled particles. In another enhancement, an activated carbon is formed by coating a carbon or carbon precursor with nanoparticles, carbonizing if the carbon is a carbon precursor, then catalytically activating in air and an inert gas, and physically activating in steam or carbon dioxide. An activated carbon may also be formed by physically activating a previously chemically activated carbon.

27 Claims, 18 Drawing Sheets

(56) References Cited

U.S. PATENT DOCUMENTS

| | | | |
|---|---|---|---|
| 6,713,011 B2 | 3/2004 | Chu et al. | |
| 6,737,445 B2 | 5/2004 | Bell et al. | |
| 6,753,454 B1 | 6/2004 | Smith et al. | |
| 6,790,528 B2 | 9/2004 | Wendorff et al. | |
| 6,804,108 B2 | 10/2004 | Nanjundiah et al. | |
| 6,805,730 B2 | 10/2004 | Herczeg | |
| 6,830,595 B2 | 12/2004 | Reynolds, III | |
| 6,879,482 B2 | 4/2005 | Kawasato et al. | |
| 6,934,144 B2 | 8/2005 | Ooma et al. | |
| 7,056,455 B2 | 6/2006 | Matyjaszewski et al. | |
| 7,214,640 B2 | 5/2007 | Margetts | |
| 7,214,646 B1 | 5/2007 | Fujino et al. | |
| 7,268,995 B2 | 9/2007 | Yoshida et al. | |
| 7,296,691 B2 * | 11/2007 | Koslow | 210/501 |
| 7,370,657 B2 * | 5/2008 | Zhuang et al. | 131/331 |
| 7,517,832 B2 | 4/2009 | Sakurai et al. | |
| 2003/0026755 A1 | 2/2003 | Jaroniec et al. | |
| 2003/0179537 A1 | 9/2003 | Tanaka et al. | |
| 2003/0185741 A1 | 10/2003 | Matyjaszewski et al. | |
| 2004/0024074 A1 | 2/2004 | Tennison et al. | |
| 2004/0047798 A1 | 3/2004 | Oh et al. | |
| 2004/0062989 A1 | 4/2004 | Ueno et al. | |
| 2004/0091415 A1 | 5/2004 | Yu et al. | |
| 2004/0097369 A1 | 5/2004 | Freel et al. | |
| 2005/0025974 A1 | 2/2005 | Lennhoff | |
| 2005/0207902 A1 | 9/2005 | Bonofacio et al. | |
| 2005/0207961 A1 | 9/2005 | Brooks et al. | |
| 2005/0207962 A1 | 9/2005 | Dietz et al. | |
| 2005/0219788 A1 | 10/2005 | Chow et al. | |
| 2005/0266990 A1 | 12/2005 | Iwasaki et al. | |
| 2006/0040157 A1 | 2/2006 | Popov et al. | |
| 2006/0165584 A1 | 7/2006 | Gogotsi et al. | |
| 2006/0263288 A1 | 11/2006 | Pak et al. | |
| 2006/0291140 A1 | 12/2006 | Kazaryan et al. | |
| 2007/0021300 A1 | 1/2007 | Farant | |
| 2007/0048521 A1 | 3/2007 | Istvan | |
| 2007/0178310 A1 | 8/2007 | Istvan | |
| 2008/0254972 A1 | 10/2008 | Istvan et al. | |
| 2009/0246528 A1 | 10/2009 | Istvan | |
| 2009/0272946 A1 | 11/2009 | Lu | |
| 2009/0290287 A1 | 11/2009 | Lipka et al. | |
| 2010/0126870 A1 | 5/2010 | Istvan et al. | |
| 2011/0220393 A1 | 9/2011 | Istvan | |
| 2012/0007027 A1 | 1/2012 | Istvan | |

FOREIGN PATENT DOCUMENTS

| | | |
|---|---|---|
| EP | 0855373 A1 | 7/1998 |
| EP | 1371607 A2 | 12/2003 |
| EP | 1526114 A1 | 4/2005 |
| EP | 1734547 A1 | 12/2006 |
| JP | 63-218159 A | 9/1988 |
| JP | 03-501509 A | 4/1991 |
| JP | 04-286108 A | 10/1992 |
| JP | 06-501910 A | 3/1994 |
| JP | 2001-135555 A | 5/2001 |
| JP | 2005-001969 A | 1/2005 |
| JP | 2005-026343 A | 1/2005 |
| KR | 10-2000-0058668 A | 10/2000 |
| KR | 10-2001-0040825 A | 5/2001 |
| KR | 10-2002-0007458 A | 1/2002 |
| KR | 10-2002-0042650 A | 6/2002 |
| KR | 10-0371402 B | 2/2003 |
| KR | 20050014033 A | 2/2005 |
| KR | 10-0675923 B1 | 1/2007 |
| RU | 2031837 C1 | 3/1995 |
| RU | 2081825 C1 | 6/1997 |
| RU | 2166478 C1 | 5/2001 |
| RU | 2223911 C1 | 2/2004 |
| WO | WO 90/03458 A1 | 4/1990 |
| WO | WO 90/05798 A1 | 5/1990 |
| WO | WO 92/06919 A1 | 4/1992 |
| WO | WO 94/13024 A1 | 6/1994 |
| WO | WO 00/11688 A1 | 3/2000 |
| WO | WO 01/89991 A1 | 11/2001 |
| WO | WO 02/21615 A2 | 3/2002 |
| WO | WO 02/49412 A1 | 6/2002 |
| WO | WO 2004/080217 A1 | 9/2004 |
| WO | WO 2004/099073 A2 | 11/2004 |
| WO | WO 2005/027244 A2 | 3/2005 |
| WO | WO/2005/118471 A1 | 12/2005 |
| WO | WO/2007/024245 A1 | 3/2007 |
| WO | WO 2007/103422 A1 | 9/2007 |
| WO | WO/2007/120386 A2 | 10/2007 |
| WO | WO 2008/100573 A1 | 8/2008 |
| WO | WO 2009/137694 A2 | 11/2009 |

OTHER PUBLICATIONS

C. Hu, C. Wang, F. Wu, and R. Tseng, *Characterization of pistachio shell-derived carbons activated by a combination of KOH and $CO_2$ for electric double-layer capacitors*, 52(7) Electrochimica Acta, 2498, 2498-2505 (Elsevier Science Ltd. 2007).

H. Tamai, T. Kakii, Y. Hirota, T. Kumamoto, and H. Yasuda, *Synthesis of Extremely Large Mesoporous Activated Carbon and Its Unique Adsorption for Giant Molecules*, 8 Chemistry of Materials 454, 454-462 (American Chemical Society 1996).

I. Tanahashi, *Comparison of the characteristics of electric double-layer capacitors with an activated carbon powder and an activated carbon fiber*, 35 J. Applied Electrochemistry 1067, 1067-1072 (Springer 2005).

M. Endo, T. Maeda, T. Takeda, Y. J. Kim, K. Koshiba, H. Hara, and M. S. Dresselhaus, *Capacitance and Pore-Size Distribution in Aqueous and Nonaqueous Electrolytes Using Various Activated Carbon Electrodes*, 148(8) J. Electrochem. Soc.: A910, A910-A914 (The Electrochemical Society 2001).

S. Shiraishi, H. Kurihara, L. Shi, T. Nakayama, and A. Oya, *Electric Double-Layer Capacitance of Meso/Macroporous Activated Carbon Fibers Prepared by the Blending Method*, 149(7) J. Electrochem. Soc. A855, A855-A861 (The Electrochemical Society 2002).

Yong-Jung Kim, Yutaka Masutzawa, Shinya Ozaki, Morinobu Endo, and Mildred S. Dresselhaus, *PVDC-Based Carbon Material by Chemical Activation and Its Application to Nonaqueous EDLC*, 151(6) J. Electrochem. Soc. E199, E199-E205 (The Electrochemical Society 2004).

Hisashi Tamai, Masayuki Kouzu, Masayuki Morita, and Hajime Yasuda, *Highly Mesoporous Carbon Electrodes for Electric Double-Layer Capacitors*, 6(10) Electrochem. and Solid State Letters A214, A214-A217 (The Electrochemical Society 2003).

J. Chmiola, G. Yushin, R. K. Dash, E. N. Hoffman, J. E. Fischer, M. W. Barsoum, and Y. Gogotsi, *Double-Layer Capacitance of Carbide Derived Carbons in Sulfuric Acid*, 8(7) Electrochem. and Solid State Letters, A357 A357-A360 (2005).

James B. Condon, *Surface Area and Porosity Determinations by Physiosorption* 160-168 (Elsevier Science & Technology Books 2006).

Y. Hanzawa, K. Kaneko, N. Yoshizawa, R.W. Pekala and M.S. Dresselhaus, *The Pore Structure Determination of Carbon Aerogels*, 4(3-4) Adsorption 187, 187-195 (Springer 1998).

D. Qu, H. Shi, *Studies of activated carbons used in double-layer capacitors*, 74(1) J. Power Sources 99-107 (Elsevier B.V. 1998).

M. Arulepp, L. Permann, J. Leis, A. Perkson, K. Rumma, A. Jänes, and E. Lust, *Influence of the solvent properties on the characteristics of a double layer capacitor*, 133 J. Power Sources 320, 320-328 (Elsevier B.V. 2004).

T.A. Centeno, F. Stoeckli, *On the specific double-layer capacitance of activated carbons, in relation to their structural and chemical properties*, 154 J. Power Sources 314, 314-320 (Elsevier B.V. 2006).

Feng-Chin Wu, Ru-Ling Tseng, Chi-Chang Hu, and Chen-Ching Wang, *The capacitive characteristics of activated carbons—comparisons of the activation methods on the pore structure and effects of the pore structure and electrolyte on the capacitive performance*, 159(2), J. Power Sources 1532, 1532-1542 (Elsevier B.V. 2006).

M. Arulepp, J. Leis, M. Lätt, F. Miller, K. Rumma, E. Lust, A.F. Burke, *The advanced carbide-derived carbon based supercapacitor*, 162(2) J. Power Sources 1460, 1460-1466 (Elsevier B.V. 2006).

E. Levy and C. Kiely, *Investigation of Fly Ash and Activated Carbon Obtained from Pulverized Coal Boilers*, DOE Project DE-FG26-

(56) References Cited

OTHER PUBLICATIONS

03NT41796 (Energy Research Center, Lehigh University 2005—Presented at DOE NETL University Coal Research Meeting, Jun. 7, 2005).
Peter J. F. Harris, *New Perspectives on the Structure of Graphitic Carbons*, 30 Critical Reviews in Solid State and Mat. Sci. 235, 235-253 (Taylor and Francis 2005).
James Economy, *Design of Advanced Materials for Water Purification*, The 8th Polymers for Advanced Technologies International Symposium, Budapest, Hungary, Sep. 13-16, 2005.
J.L. Figueiredo, Ph. Serp, B. Nysten, J.-P. Issi, *Surface treatments of vapor-grown carbon fibers produced on a substrate: Part II: Atomic force microscopy*, 37(11) Carbon 1809, 1809-1816 (Elsevier Science Ltd. 1999).
M. Endo, Y.J. Kim, H. Ohta, K. Ishii, T. Inoue, T. Hayashi, Y. Nishimura, T. Maeda, M.S. Dresselhaus, *Morphology and organic EDLC applications of chemically activated AR-resin-based carbons*, 40 Carbon 2613, 2613-26 (Elsevier Science Ltd. 2002).
O. Barbieri, M. Hahn, A. Herzog, R. Kötz, *Capacitance limits of high surface area activated carbons for double layer capacitors*, 43 Carbon 43: 1303-1310 (Elsevier Science Ltd. 2005).
Y. V. Basova, D. D. Edie, P. Y. Badheka, H. Bellam, *The effect of precursor chemistry and preparation conditions on the formation of pore structure in metal-containing carbon fibers*, 43 Carbon 1533, 1533-1545 (Elsevier Science Ltd. 2005).
A. Jänes, H. Kurig, E. Lust, *Characterisation of activated nanoporous carbon for supercapacitor electrode materials*, 45 Carbon 1226, 1226-1233 (Elsevier Science Ltd. 2007).
H. P. Fink, P. Weigel, H. J. Purz, J. Ganster, *Structure formation of regenerated cellulose materials from NMMO-solutions*, 26(9) Progress in Polymer Sci. 1473, 1473-1524, Figure 18 (Elsevier B.V. 2001).
T. Fujino, B. Lee, S. Oyama, M. Noguchi, Honda R&D Company Ltd., Tochigi Japan, *Characterization of Advanced Mesophase Carbons Using a Novel Mass Production Method*, Proceedings of the 15th International Seminar on Double-Layer Capacitors and Hybrid Energy Storage Devices, 75-83 (Deerfield Beach, Florida, Dec. 5-7, 2005).
M. Arulepp, J. Leis, A. Kuura, M. Latt, H. Kuura, L. Permann, F. Miller, K. Rumma, *Performance of Supercapacitors Based on Carbide Derived SkeletonC*, Proceedings of the 15th International Seminar on Double-Layer Capacitors and Hybrid Energy Storage Devices, 249-260 (Deerfield Beach, Florida, Dec. 5-7, 2005).
K. Ikeda, Research Center, Asahi Glass Co., Ltd., Japan, *Performance of Electric Double Layer Capacitors for High Power Application with Acetonitrile-Free Electrolyte System*, Proceedings of the 16th International Seminar on Double-Layer Capacitors and Hybrid Energy Storage Devices, 177-203 (Deerfield Beach, Florida, Dec. 4-6, 2006).
W. M. T. M. Reimerink and R. W. Koedijk, NORIT, Netherland, B.V., Netherlands, *The Influence of the Pore Size Distribution of Activated Carbons on the Power and Energy Density*, Proceedings of the 16th International Seminar on Double-Layer Capacitors and Hybrid Energy Storage Devices, 256-281 (Deerfield Beach, Florida, Dec. 4-6, 2006).
P. Walmet, L. H. Hiltzik, E. D. Tolles, B. J. Craft and J. Muthu, MeadWestvaco, Charleston, SC, USA, *Electrochemical Performance of Activated Carbons Produced from Renewable Resources*, Proceedings of the 16th International Seminar on Double-Layer Capacitors and Hybrid Energy Storage Devices, 581-607 (Deerfield Beach, Florida, Dec. 4-6, 2006).
International Preliminary Report on Patentability and Written Opinion for PCT Application No. PCT/US2008/001963, 8 pages, Jun. 24, 2008.
International Search Report for PCT Application No. PCT/US2008/001963, 3 pages, Jun. 24, 2008.
An et al., "Electrochemical Properties of High-Power Supercapacitors Using Single-Walled Carbon Nanotube Electrodes", *Adv. Funct. Mater.*, vol. 11, No. 5, pp. 387-392, 2001.
Babic et al., "Characterization of Carbon Cryogels Synthesized by Sol-Gel Polycondensation", *J. Serb. Chem.*, vol. 70, No. 1, pp. 21-31, 2005.
Bae et al., "New Chiral Heterogeneous Catalysts Based On Mesoporous Silica: Asymmetric Diethylzinc Addition to Benzaldehyde", Chem. Commun. 2000, pp. 31-32.
Becker, "Carbon Copy," *Research Horizons Magazine*, Winter 2004, 3 pages.
Becker, "Protecting Big Birds", *Research Horizons*, Winter 2004. 1 page.
Becker, Supercapacitors: Researchers Develop Manufacturing Technology to Produce Electrical Devices from Carbon Nanotubes, *Research Horizons Magazine*, Apr. 13, 2004, 3 pages.
Bertalan et al., "Polymers for Advanced Technologies", *Chem. Intl.*, pp. 28-31, 2006.
Burke, "Ultracapacitors: Why, How, and Where is the Technology", *J. Power Sources*, vol. 91, pp. 37-50, 2000.
Chmiola et al. "Anomalous Increase in Carbon Capacitance at Pore Sizes Less Than 1 Nanometer", *Science Express*, (10. 1126/science.1132195), p. 1, Aug. 17, 2006.
Chmiola et al., "Effect of pore size and surface area of carbide derived carbons on specific capacitance", *J. Power Sources*, vol. 158, No. 1, pp. 765-772, 2006.
Deryn Chu et al., "Ceria Based Nano-Scale Catalysts for Water-Gas Shift (WGS) Reaction", US Army Research Laboratory, 5 pages.
Yoseph Bar-Cohen, "Smart Structures and Materials 2004: Electroactive Polymer Actuators and Devices" (EAPAD), The International Society for Optical Engineering, Jul. 2004, 16 pages.
Conway, "Electrochemical Capacitors", *Electrochemistry Encyclopedia* Maintained by the Electrochemical Science and Technology Information Resource (ESTIR), Yeager Center for Electrochemical Science (YCES), Case Western Reserve University, 2003. www.electrochem.cwru.edu. 14 pages.
Atul Dahiya et al., "Dry-Laid Nonwovens", http://www.engr.utk.edu./mse/pages/Textiles/Dry%20Laid%20Nonwovens.htm, pp. 1-10.
Chunsheng Du, Jeff Yeh and Ning Pan, "Carbon Nanotube Thin Films With Ordered Structures", J. Mater. Chem. vol. 15, No. 5, pp. 548-550, 2005.
Eliad et al., "Ion Sieving Effects in the Electrical Double Layer of Porous Carbon Electrodes: Estimating Effective Ion Size in Electrolytic Solutions", *Journal of Physical Chemistry B*, vol. 105, No. 29, pp. 6880-6887, 2001.
Endo et al., "Structure and Application of Various Saran-Based Carbons to Aqueous Electric Double-Layer Capacitors", *J. Electro. Soc.*, vol. 149, 11, pp. A1473-A1480, 2002.
S. Escribano, S. Berthon, J.L. Ginoux et P Achard, "Characterization of carbon aérogels", Eurocarbon'98, Science and Technology of Carbon (GFEC), vol. 2, Strasbourg (Jul. 5-9, 1998), 841-842.
Extended European Search Report issued in corresponding European Patent Application No. 06849690.0, May 10, 2011. 8 pages.
Frackowiak et al., Supercapacitor Electrodes From Multiwalled Carbon Nanotubes, *App. Physics Lett.*, vol. 77, 15, pp. 2421-2443, 2000.
Frackowiak et al., "Carbon materials for the electrochemical storage of energy in capacitors", *Carbon*, vol. 39, pp. 937-950, 2001.
Fu et al., "Studies of the Chemical and Pore Structures of the Carbon Aerogels Synthesized by Gelation and Supercritical Drying in Isopropanol", *J. Appl. Polym. Sci.*, vol. 91 pp. 3060-3067, 2004.
Fuertes, "Templated Mesoporous Carbons for Supercapacitor Application", *Electrochimica Acta*, vol. 50. No. 14, pp. 2799-2805, 2005.
Fujino, Speaker 10, Slide 12, Advanced Capacitors World Summit, Jul. 17-19, 2006.
M. Gan et al., "Predicting Packing Characteristics of Particles of Arbitrary Shapes", KONA No. 22, pp. 82-90. (2004).
G. Garnweitner et al., "Nonaqueous and surfactant-free synthesis routes to metal oxide nanoparticles". J. Am. Ceram. Soc. vol. 89, No. 6, 1801-1808, 2006.
Gavalda et al., Nitrogen Adsorption in Carbon Aerogels: A molecular simulation study. *Langmuir—The American Chemical Society*, vol. 18, No. 6, pp. 2141-2151, 2002.
Ghosh et al., "Development of Layered Functional Fiber Based Micro-Tubes", *National Textile Center Annual Report*, NTC Project F02-NS05, pp. 1-9, 2002.

(56) References Cited

OTHER PUBLICATIONS

Han et al., "Novel Silica-Sol Mediated Synthesis of High Surface Area Porous Carbons", Carbon, vol. 37, 1999 pp. 1645-1647.
Han et al., "Simple Silica-Particle Template Synthesis of Mesoporous Carbons", Chem. Commun., 1999, pp. 1955-1956.
Harris et al., "High-resolution electron microscopy of a microporous carbon", Philos. Mag. Letters, vol. 80, No. 6, pp. 381-386, 2000.
Hegde et al., "Carbon Fibers", Updated Apr. 2004. http://www.engr.utk.edu/mse/Textiles/CARBON%20FIBERS.htm, 7 pages.
Hong et al., "Preparation of Mesoporous Activated Carbon Fibers by Catalytic Gasification", Korean J. Chem. Eng., vol. 17, No. 2, pp. 237-240, 2000.
Hosotsubo et al., "R&D on High-Performance Electrode Materials Using Petroleum Pitch-based Carbon Fiber," Petroleum Energy Center, pp. 1-10, 2001, 10 pages.
Denisa Hulicova et al., "The Capacitive Performance of Nitrogen-Enriched Carbon in Different Electrolytes", National Institute of Advanced Industrial Science and Technology, 1 page.
Ikeda et al., "Material Development of Electric Double Layer Capacitor for Fuel Cell Electric Vehicle and the Newly Developed Electric Double Layer Capacitor", Reports Res. Lab, Asahi Glass Co. Ltd., vol. 54, pp. 33-39, 2004.
IUPAC Compendium of chemical Terminology, 2nd Edition, 1997.
Jiang et al., "Carbon Nanofibers Synthesized by Decomposition of Alcohol at Atmospheric Pressure", App. Phys. Lett., vol. 81, 3, pp. 526-528, 2002.
Johnson, "Nanotubes enable dense supercapacitors", Automotive Design Line, Mar. 2005.
Joho et al., "The Correlation of the Irreversible Charge Loss of Graphite Electrodes with their Double Layer Capacitance", PSI Scientific Report 2000. vol. V, General Energy, pp. 69-70, 70 (Paul Scherrer Institut, Mar. 2001).
Kim et al., "Raman Spectroscopic Evaluation of Polyacrylonitrile-Based Carbon Nanofibers Prepared by Electrospinning", J. Raman Spect., vol. 35, 11, pp. 928-933, 2004.
Kim et al., "Cobalt on Mesoporous Silica: The First Heterogeneous Pauson-Khand Catalyst", J. Am. Chem. Soc., vol. 122, 2000, pp. 1550-1551.
Kim et al., "Electrochemical Properties of Carbon Nanofiber Web as an Electrode for Supercapacitor Prepared by Electrospinning", Applied Physics Letters, vol. 83, 6, pp. 1216-1218, 2003.
Kinoshita, Carbon Electrochemical and Physical Properties, 1988.
Kong et al., "Gas Permeability of Carbon Aerogels", J. Mater. Res., vol. 8, No. 12, pp. 3100, 1996.
Kyotani, "Control of Pore Structure in Carbon", Carbon, vol. 38, pp. 269-286, 2000.
Lee et al., "Simple Synthesis of Uniform Mesoporous Carbons with Diverse Structures From Mesostructured Polymer/Silica Nanocomposites", Chem. Materials, vol. 16, pp. 3323-3330, 2004.
Lee et al., "Synthesis of new nanoporous carbon materials using nanostructured silica materials as templates", J. Mater. Chem., vol. 14, pp. 478-486, 2004.
Lee et al., "Development of a New Mesoporous Carbon Using an HMS Aluminosilicate Template", Advanced Materials, vol. 12, 1999, pp. 359-362.
Lee et al., "Synthesis of a New Mesoporous Carbon and its Application to Electrochemical Double-Layer Capacitors", Chem. Commun., pp. 2177-2178, 1999.
Dr. Angel Linares, "Methane Storage in Activated Carbon Fibres", Dept. of Inorganic Chemistry, Carbon and Environmental Group, 5 pages.
Lipka, S.M. et al., "Alternative Material Chemistries for Hybrid Electrochemical Capacitors," 16th International Seminar on Double Layer Capacitors & Hybrid Energy Storage Devices, Dec. 4-6, 2006, 30 pages.
Lu et al., "Mesoporous Activated Carbon Filaments", Carbon, vol. 35, 3, pp. 427-430, 1997.
Miller et al., "Properties and Performance of Hybrid Aluminum Electrolytic/electrochemical Capacitors", Evans Capacitor Company, Technical Papers, 11 pages.

Miller et al., "Ultracapacitor Assisted Electric Drives for Transportation", Maxwell Technologies Inc. 14 pages.
J.M. Miller et al., "Deposition of Ruthenium Nanoparticles on Carbon Aerogels for High Energy Density Supercapacitor Electrodes", California Univ. Los Angeles Dept. of Materials Science and Engineering, 1 page.
Muñoz et al., "Phosphoric and Boric Acid Activation of Pine Sawdust", Journal of Chemical Technology & Biotechnology, vol. 78 Issue 12, pp. 1252-1258, 2003. Abstract. 2 pages.
Naminsnyk, Thesis entitled "A Survey of Electrochemical Supercapacitor Technology", University of Technology, Sydney, pp. 1-109, 2003.
Niederberger et al., "Organic Reaction Pathways in the Nonaqueous Synthesis of Metal Oxide Nanoparticles", Chem. Eur. J., vol. 12, pp. 7282-7302, 2006.
Oya et al., "Formation of Mesopores in Phenolic Resin-Derived Carbon Fiber by Catalytic Activation Using Cobalt", Carbon, vol. 33, No. 8, pp. 1085-1090, 1995.
Ozaki et al., "Preparation of Platinum Loaded Carbon Fiber by Using a Polymer Blend", Carbon, vol. 35, No. 10, pp. 1676-1677, 1997.
Park et al, "Monodisperse Nanoparticles of Ni and NiO: Synthesis, Characterization, Self-Assembled Superlattices, and Catalytic Applications in the Suzuki Coupling Reaction", Adv. Mater. vol. 17, No. 4, pp. 429-434, 2005.
Park et al, "Mesoporous Carbon Materials as Electrodes for Electrochemical Double-Layer Capacitor", Materials Research Society Symposium BB (Mobile Energy), Proceedings vol. 973E. Boston Massachusetts, Nov. 27-Dec. 1, 2006.
Pröbstle et al., "Button Cell Supercapacitors with Monolithic Carbon Aerogels", J. Power Sources, vol. 105, pp. 189-194, 2002.
Shen, Wenzhong et al., "Development of mesopore in activated carbon by catalytic steam activation over yttrium and cerium oxides," Journal of Materials Science Letters, 22, 2003, pp. 635-637.
Signorelli, Riccardo et al., "High Density Energy Storage Using a Nanotube-Enhanced Ultracapacitor," 16th International Seminar on Double Layer Capacitors & Hybrid Energy Storage Devices, Dec. 4-6, 2006, 18 pages.
Smith et al., "Evaluation of Carbon Electrodes for Non-Aqueous Asymmetric EDL Capacitors", Proceedings of the 16th International Seminar on DLC, U. S. Naval Surface Warfare Center, Dec. 4-6, 2006. 26 pages.
Smith et al, "Activated Carbon Electrodes For Non-Aqueous Asymmetric Capacitors", http://www.apsci.com/ppi-pyro3.html. pp. 571-574.
Soneda et al., "Huge Electrochemical Capacitance of Exfoliated Carbon Fibers", Carbon, vol. 41, pp. 2680-2682, 2003.
Tom Stieghorst, "Spotless Ships Have Not Curtailed Disease Outbreaks", Sun-sentinel.com.
Geoffrey F. Strouse et al., "A Self-Assembly Approach to Molecularly Engineered Titanium Surfaces: Applications Towards Selective Photo-Oxidation", Los Alamos National Laboratory, Dept. of Chem. Science & Technology, Los Alamos, NM, 15 pages.
Subbiah et al., "Electrospinning of Nanofibers," Journal of Applied Polymer Science, vol. 96, No. 2, pp. 557-569, 2005.
Yu-Lee Tai, "Application of Porous and Nanosized Nickel in Electrochemical Energy Storage", Masters Thesis, etd-0725105-163206, Department of Chemical Engineering, National Cheng Kung University, Taiwan. Abstract 2002.
Tamai, Hisashi et al., "Preparation of highly mesoporous and high surface area activated carbons from vinylidene chloride copolymer containing yttrium acetylacetonate," Letters to the Editor, Carbon, 411, 2002, pp. 1645-1687.
H. Tamai, M. Kouzu, and H. Yasuda, "Preparation of Highly Mesoporous and High Surface Area Activated Carbons from Vinylidene Chloride Copolymer" Carbon, vol. 41, No. 8, 1678-1681 (2003).
Toyoda et al., "Exfoliated Carbon fibers as Electrode For EDLC in H2SO4", The Electrochemical Society, 206th meeting, ABST 642, 2004.
Tran et al., "Carbon Aerogels and Their Applications in Supercapacitors and Electrosorption Processes", Chemistry & Materials Science Dept., Lawrence Livermore National Laboratory, Livermore, CA 94550, 6 pages.

(56) References Cited

OTHER PUBLICATIONS

Gregor Trimmel et al., "Sol-Gel Processing of Alkoxysilyl-Substituted Nickel Complexes for the Preparation of Highly Dispersed Nickel in Silica", New Journal of Chemistry, 2002, 26(6), pp. 759-765. Abstract.

Unknown author, "Determination of an electrode real surface area and a roughness factor," Real electrode area, http://chem.ch.huji.ac.il/~eugeniik/surfacearea0.htm, printed Jan. 7, 2006, 2 pages.

Unknown Author, "Basic Properties of Carbon Nanotubes", 2002-2005, Applied Technologies, Inc. 6 pages.

Unknown Author, "Carbon Fiber Guide", Asbury Graphite Mills, Inc., Jun. 2003, 1 page.

Unknown Author, "Mesoporous Activated Carbons with Metal Oxide Nanoparticles," www.aist.go.jp, 2001, 2 pages.

Unknown Author, "Choosing the Proper Short Cut Fiber for Your Web", Minifibers, Inc. www.minifibers.com, 6 pages.

Unknown Author, "Pyrograf III", Pyrograf Products Incorporated, http://www.apsci.com/ppi-pyro3.html, 4 pages.

Unknown author, Advanced Capacitors World Summit, Speaker 20, slide 14, 2006.

Unknown author, Mitsui Chemical at Minatec 2003 in Grenoble France.

Wang et al., "Pyrolysis Temperature and Time Dependence of Electrical Conductivity Evolution for Electrostatically Generated Carbon Nanofibers", *IEEE Trans. Nanotech.*, vol. 2, No. 1, pp. 39-43, 2003.

Eric W. Weisstein. "Circle Packing." From *MathWorld*—A Wolfram Web Resource. http://mathworld.wolfram.com/CirclePacking.html, Printed Dec. 13, 2005. 7 pages.

Weisstein, Sphere Packing, *CRC Concise Encyclopedia of Mathematics*, $2^{nd}$ Edition. 6 pages.

Bernd Willer, "Investigation on Storage Technologies for Intermittent Renewable Energies" Evaluation and Recommended R&D Strategy, Institut für Solare Energieversorgungstechnik (ISET) e. V., Jun. 17, 2003, pp. 1-23.

Williams et al., "Random packings of spheres and spherocylinders simulated by mechanical contraction", *Physical Review*, vol. 67, pp. 051301-1-051301-9, 2003.

Xing et al., "Synthesis and Electrochemical Properties of Mesoporous Nickel Oxide", *J. Power Sources*, vol. 134, pp. 324-330, 2004.

Yamada et al., "Electric Double Layer Capacitance Performance of Porous Carbons Prepared by Defluorination of Polytetrafluoroethylene with Potassium", *Electrochemical and Solid State Letters*, vol. 5, No. 12, pp. A283-A285, 2002.

Yoon et al., "Electric Double-Layer Capacitor Performance of a New Mesoporous Carbon", J. Electrochemical Society, vol. 147 No. 7, pp. 2507-2512, 2000.

Yoshizawa et al., "Coal-Based Activated Carbons Prepared with Organometallics and Their Mesoporous Structure", *Energy & Fuels*, vol. 11, pp. 327-330, 1997.

Zeng et al., "Choosing the Impregnants by Thermogravimetric Analysis for Preparing Rayon-Based Carbon Fibers", Journal of Inorganic and Organometallic Polymers and Materials, vol. 15, No. 2, pp. 261-267, Jun. 2005.

Zeng et al., "The Structural Transitions of Rayon Under the Promotion of a Phosphate in the Preparation of ACF", Cellulose, vol. 15 No. 1, pp. 91-99, 2007.

Zhi-Chang et al., Study on Activation of Pitch-based Carbon Spheres Impregnated with Different Metals, Mat.Sci. Eng., vol. No. 14, 1999. 4 pages.

Office Action from counterpart Japanese Application No. 2009-549621, dated Feb. 27, 2013, 7 pages.

Ivanov, V. et al., "The study of carbon nanotubes produced by catalytic method," Chemical Physical Letters, vol. 223, Issue 4, Jun. 24, 1994, pp. 329-335.

Unknown author, "Establishment of a new field of technical activity on *Nanotechnologies*," ISO Technical Management Board, Apr. 28, 2005, 13 pages.

Unknown author, "typical," Real Dictionary, © 2000-2011, 2 pages.

Office Action from Japanese Application No. 2008-553215, dated Jun. 26, 2012, 5 pages (with translation).

Office Action from Japanese Application No. 2008-555389, dated Jul. 3, 2012, 6 pages (with translation).

Office Action from Korean Application No. 10-2008-7007218, dated Aug. 22, 2012, 19 pages (with translation).

Office Action from U.S. Appl. No. 11/345,188, dated Sep. 24, 2012, 14 pages.

Office Action from co-pending U.S. Appl. No. 13/109,702, dated Oct. 19, 2012, 17 pages.

Office Action from co-pending U.S. Appl. No. 12/987,794, dated Sep. 24, 2013, 8, pages.

\* cited by examiner

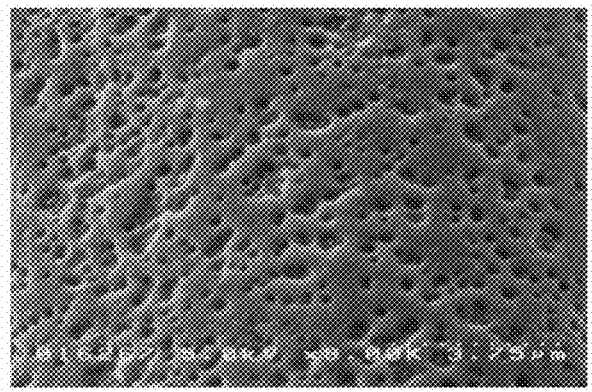
0.25 wgt.% Ni(acac)$_2$ in THF (3x) activated in 1:1 air:N$_2$ @ 800°C for 7 minutes
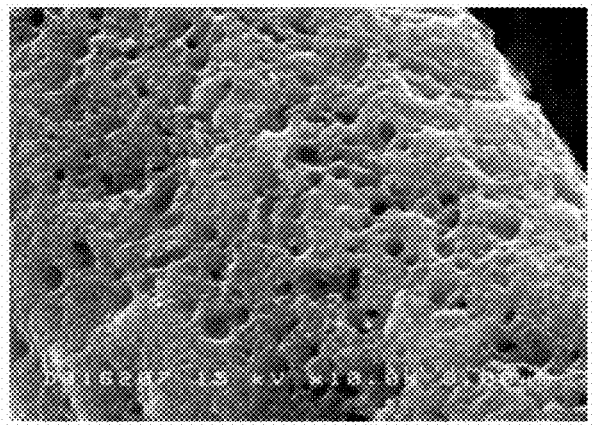
0.25 wgt.% Fe(acac)$_3$ in THF (3x) activated in 1:1 air:N$_2$ @ 800°C for 7 minutes
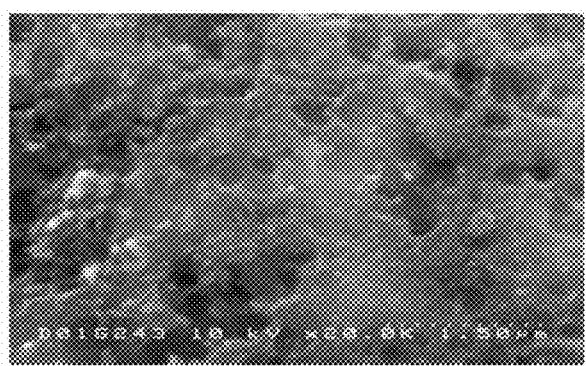
Steam Activated Kynol Carbon Fiber 0.25 wgt.% Ni (3x) 900°C for 60 minutes
FIG. 17

After Steam Activation
Kynol Carbon Fiber After Exposure to 1:1 air:$N_2$ (0.1 wgt. % Ni(acac)$_2$) + Steam
Kynol Carbon Fiber After Exposure to 1:1 air:$N_2$ (0.1 wgt. % Fe(acac)$_3$) + Steam
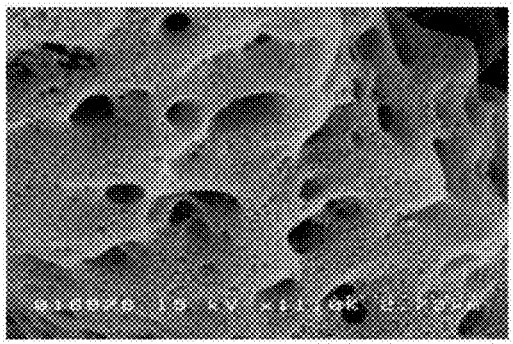
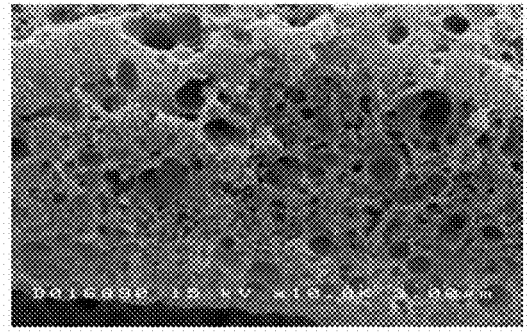
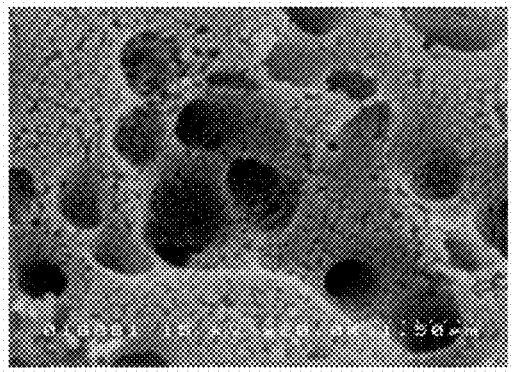
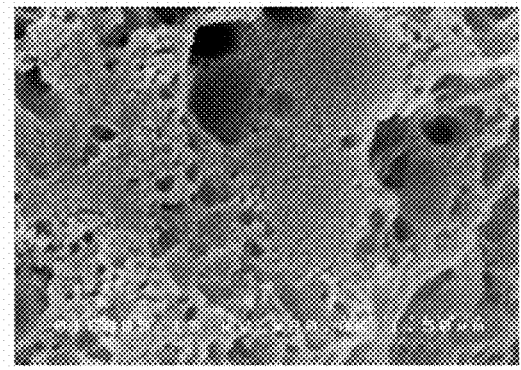
FIG. 19

METHODS OF FORMING ACTIVATED CARBONS

RELATED APPLICATIONS

This application claims the benefit of U.S. Provisional Application No. 60/901,850, filed on Feb. 14, 2007, titled "Mesoporous Multiply Activated Carbon," U.S. Provisional Application No. 60/961,432, filed on Jul. 20, 2007, titled "Processed Activated Carbons," U.S. Provisional Application No. 60/961,320, filed on Jul. 20, 2007, titled "Sequentially Activated Carbons," and U.S. Provisional Application No. 61/005,587 filed on Dec. 6, 2007, titled "Compound Activated Carbons. This application is related to International Application PCT/US2008/001963, titled "Methods of Forming Activated Carbons," filed on Feb. 14, 2008.

TECHNICAL FIELD

The present invention relates to activated carbons and to methods for their preparation. The activated carbons may be used in all manner of devices that may contain activated carbon materials, including but not limited to various electrochemical devices (e.g., capacitors, batteries, fuel cells, and the like), hydrogen storage devices, filtration devices, catalytic substrates, and the like.

BACKGROUND OF THE INVENTION

In many emerging technologies, such as electric vehicles and hybrids thereof, there exists a need for capacitors with both high energy and high power densities. Much research has been devoted to this area, but for many practical applications such as hybrid electric vehicles, fuel cell powered vehicles, and electricity microgrids, the current technology is marginal or unacceptable in performance and too high in cost. See *DOE Progress Report for Energy Storage Research and Development fy2005* (January 2006) and *Utility Scale Electricity Storage* by Gyuk, manager of the Energy Storage Research Program, DOE (speaker 4, slides 13-15, Advanced Capacitors World Summit 2006).

Electrochemical double layer capacitors (EDLC's, a form of electrochemical capacitor called an ultracapacitor, sometimes also called a supercapacitor) are one type of capacitor technology that has been studied for such applications. Electrochemical double layer capacitor designs rely on very large electrode surface areas, which are usually made from "nanoscale rough" metal oxides or activated carbons coated on a current collector made of a good conductor such as aluminum or copper foil, to store charge by the physical separation of ions from a conducting electrolyte into a region known as the Helmholtz layer that forms immediately adjacent to the electrode surface. See U.S. Pat. No. 3,288,641. There is no distinct physical dielectric in an EDLC. Nonetheless, capacitance is still based on physical charge separation across an electric field. The electrodes on each side of the cell and separated by a porous membrane store identical but opposite ionic charges at their surfaces within the double layer, with the electrolyte solution in effect becoming the opposite plate of a conventional capacitor for both electrodes.

It is generally accepted that EDLC internal carbon pore size should be at least about 2 nm for an aqueous electrolyte or at least about 3 nm for an organic electrolyte to accommodate the solvation spheres of the respective electrolyte ions in order for the pores to contribute their surface for Helmholtz double layer capacitance. See *J. Electrochem. Soc.* 148 (8): A910-A914 (2001) and *Electrochem. and Solid State Letters* 8 (7): A357-A360 (2005). Internal pores also should be accessible from the outer particle surface for electrolyte exposure and wetting, rather than sieving. The more total accessible surface, the better. Conventional activated carbons used in ELDC devices have many electrochemically useless micropores (i.e., below 2 nm according to the IUPAC definition). In the highly activated electrochemical carbons reported in the literature, total utilized surface is typically thought to be 10% (see U.S. Pat. No. 6,491,789) to 20% (see U.S. Pat. No. 6,737,445). A typical mesopore proportion in commercial electrocarbons may range from a low of 5% to a high of 22% mesopore with DFT surfaces ranging from about 1300 m$^2$/g to about 1900 m$^2$/g. See *Walmet (MeadWestvaco), Proceedings of the 16$^{th}$ International Seminar on DLC (IS-DLC)*: 139-140 (2006).

Several alternative approaches to producing a high usable surface carbon suitable for EDLC devices using organic electrolytes at their desirable higher operating voltages have been undertaken. These include unusual carbon precursors (for example, U.S. Pat. No. 6,660,583), novel carbonization regimes (for example U.S. Pub. No. 2005/0207961), novel physical activation regimes lasting many hours or even days (*for example those mentioned by Norit Nederland B V—a major activated carbon supplier—in Proceedings of 16$^{th}$ ISDLC*: 95 (2006) as "steam activation at 800-1000 C" with residence time in the kiln "from several hours to several days"), novel chemical activation regimes (for example, U.S. Pat. No. 5,877,935), carbon aerogels (for example, U.S. Pat. No. 5,626,977, U.S. Pat. No. 5,898,564), various templating techniques (for example U.S. Pat. No. 6,297,293, U.S. Pub. No. 2004/0091415, U.S. Pat. No. 6,737,445), carbide derived carbons (for example, PCT/EE20051000007, U.S. Pub. No. 2006/0165584) and carbon nanotubes (for example, U.S. Pat. No. 6,491,789 and U.S. Pat. No. 6,934,144) or equivalents (for example, U.S. Pub. No. 2005/0025974). Each of these approaches has significant limitations. An application by one of these inventors, PCT/US2007/004182 (claiming priority to U.S. Provisional Application No. 60/773,538, filed Feb. 15, 2006) analyzes these limitations, and discloses a novel method of producing improved mesoporous carbons from any suitable precursor by use of catalytic nanoparticles.

For applications including electrochemical capacitors, hybrid capacitor/battery devices such as Fuji Heavy industries LiC, and asymmetric batteries, it is desirable to precisely engineer the mesoporous carbon to the requirements of the device (energy density, power density, electrolyte system) by suitably adjusting the induced mesoporosity.

While surface area created by internal porosity is important for filtration carbons, the prior art overlooks the effect of exterior surface. True exterior surface is particularly important for specific capacitance because of sieving microporosity. Increasing true exterior surface for any given geometric object by definition means increasing rugosity. Exterior surface of an activated carbon particle or fiber is by definition accessible to electrolyte, whereas a substantial proportion of interior pore surface probabilistically is not available because of sieving micropores. See PCT/US2007/004182. Discussion of the true exterior of activated carbons is virtually nonexistent in the electrocarbon scientific literature, since conventionally it was thought to be very small in comparison to the internal pore surface of activated carbons. Two of three notable exceptions suffer from methodological flaws.

First, in *Electrochimica Acta* 41 (10): 1633-1639 (1996) Shi assumed that all mesopores were external. This is readily proven not true. See, for example, *Chem. Mater.* 8: 454-462 (1996), *J. Electrochem. Soc.* 149 (7): A855-A861 (2002), and *Electrochem. and Solid State Letters* 6 (10): A214-A217

(2003). Moreover, certain results Shi derived using this assumption he himself could not fully explain. Extrapolations therefrom can be problematic. See *Carbon* 43: 1303-1310 (2005).

Second, in *J. Power Sources* 154: 314-320 (2006) Stöckli attempted to reinterpret Shi using multivariate statistical analysis on a different sample set of activated carbons, with partial success. Stöckli assumed that external surface measured using the Brunauer, Emmett and Teller method (BET) was relative to that of a "nonporous" carbon black. However, it has been shown that while the BET surface of reference Vulcan XC 72 carbon black is about 254 $m^2$/g (manufacturer spec), ranging from 259 $m^2$/g BET in *J. Power Sources* 154: 314-320 (2006) to 240 $m^2$/g BET in *Carbon* 43:1303-1310 (2005), the surface measured by Density Functional Theory (DFT) in those papers is only 132 $m^2$/g and 119 $m^2$/g respectively. The theoretical geometric surface of a random packing of perfect hard identical spheres (using the Bernal packing limit 0.635 for the manufacturer Vulcan XC 72 specification of $D_{50}$ 30 nm and 1.80 g/cc) is 111 $m^2$/g-reasonably close to the DFT estimate. Therefore the BET carbon black surface produces errors by a factor of about 2. Without wishing to be limited by theory, this is likely due to capillary condensation in the mesopore voids between the nanospheres. See *Condon, Surface Area and Porosity Determination by Physiosorption*, (1998) pp. 160-169, and *Adsorption* 4:187-196 (1998). Therefore, comparative BET external surface estimates are suspect. Stöckli's statistically derived external surface contribution coefficients are only 0.124 (equation 5) to 0.134 (equation 10) for the smaller exterior, versus higher contribution coefficients of at least 17.7 (equation 5) to 17.4 (equation 10) for the much larger interior surface. In effect, the suspect external (under) estimates resulted in multivariate equations suggesting most capacitance arises from internal surfaces in accordance with conventional thinking.

Third, in *Proceedings of $16^{th}$ ISDLC*: (*special late session available in the electronic version, pages* 18-20) (2006), Ikeda of Asahi Research Labs used $^{19}F$ nuclear magnetic resonance (NMR) of the anion $BF_4$ in propylene carbonate to characterize the carbon location of adsorbed anions in a working EDLC device. This was part of a study of additives for improving low temperature conductivity and the breakdown withstand voltage of propylene carbonate solvent. See U.S. Pat. No. 6,879,482. The experiments show convincingly that, depending on the probability of access to interior pore surface (indicated by increasing average pore size), from none to only about half of the anions (at very large average pore sizes greater than 1.5 nm) were internally adsorbed. The anion is the smaller of the two in the tested electrolyte system; the larger cation has less access and is therefore kinetically controlling. See for example *Carbon* 40: 2613-2626 (2002). At least half of the anions, and therefore more than half of the kinetically controlling cations, were shown by NMR to be adsorbed on the exterior surface. This is a surprisingly high value compared to conventional thinking, but fully consistent with the disclosures in PCT/US2007/004182. It is direct experimental evidence of the importance of the external surface of activated carbons.

True exterior surface originates more than half of total specific capacitance in typical activated carbons. Increasing exterior surface by increasing rugosity therefore is important for improving the energy density of electrocarbons.

As a direct consequence of the importance of exterior surface, it follows directly from Euclidean geometry that smaller particles have more exterior for a given volume/mass of carbon. As an example of the utility of smaller particles, carbide derived carbons (CDC's) have specific capacitance as high as 120-135 F/g despite having almost entirely microporous pore distributions. CDC's typically have a tight particle size distribution from about 1-3 microns (*see for example J. Power Sources* 133: 320-328 (2004) *and J. Power Sources* 162: 1460-1466 (2006)) to about 6 microns (*see for example, Electrochem. and Solid State Letters* 8 (7): A357-A360 (2005)). They consequently have among the highest volumetric energy densities of all carbons (*see for example, Proceedings of $15^{th}$ ISDLC*: 250 *and* 259 (2005)). By comparison, commercial electrocarbons typically have a looser $D_{50}$ of about 8 microns, up to four times larger median particles and a larger overall polydispersion, with proportionately less exterior per unit volume/mass. (See for example, U.S. Pat. No. 6,643,119, and *Proceedings of $16^{th}$ ISDLC:* 141 (2006)).

The chosen carbon activation method can impact rugosity, and thus, the specific capacitance of the resulting material. Alkali activation is conventionally found to produce better specific capacitance despite the fact that pore size distributions and average pore sizes of resulting materials are not substantially different than for other activation processes. For example, U.S. Pat. No. 5,877,935 describes material in which at least 40% of the pores are between 1 and 2 nm, i.e. microporous. For detailed analyses of large samples of activated carbons, *see for example Electrochemica Acta* 41 (10): 1633-1639 (1996), *J. Power Sources* 74: 99-107 (1998), and *J. Power Sources* 154: 314-320 (2006). Without wishing to be bound by theory, one mechanism for enhanced usable surface from alkali activation (despite the predominance of micropores) is increased rugosity. *See for example, FIG. 1 of Carbon* 40: 2613-2626 (2002), *and FIG. 2 with accompanying discussion on page E*201 *of J. Electrochem. Soc.* 151 (6): E199-E205 (2004). Based on the micron magnification scales of these imaged activated carbon particles, at least some alkali activation rugosity is at relatively large physical scales on the order of hundreds of nanometers. Visual differences in rugosity with different activation times and at different activation temperatures correlate with observed variations in specific capacitance. Neither mesopore surface, nor mesopore volume, nor total surface, nor increase in average pore size correlated to the observed changes in specific capacitance.

Conventional physical activation also produces rugosity, although principally on a different physical scale. Spalled individual carbon subunits, or small aggregates thereof below 100 nm in dimension, were imaged by *DOE project DE-FG-26-03NT41796* (*Lehigh University June* 2005). Equally important is molecular level etching of individual carbon subunits (without, for example, formation of potassium carbonate particles as in alkali activation) caused by steam or carbon dioxide. This results in oxidative pitting of the carbon exterior surface on a scale of 1 nm to about 10-15 nm, or up to about the dimension of individual carbon subunits. *See for example Critical Reviews in Solid State and Mat. Sci.* 30: 235-253 (2005). Such subunit scale activated carbon surface pitting has been imaged using high-resolution transmission electron microscopy (HRTEM). *See, for example, Economy, Proceedings of the $8^{th}$ Polymers for Advanced Technology International Symposium, Budapest* 11-14 *September* 2005. Similar oxidative pitting on the same dimensional scale has been directly measured using atomic force microscopy (AFM) on surface treated vapor grown carbon fiber (VGCF). Treatment increases rugosity more than 17 times over untreated VGCF. *See Carbon* 37 (11): 1809-1816 (1999).

Researchers have previously attempted to combine activation processes without success. For example, *Carbon* 45 (6): 1226-1233 (2007) reports a new attempt to improve RP-20 (formerly designated BP-20) mesoporosity, a standard electrocarbon (see, for example, U.S. Pat. No. 6,643,119) produced by Kuraray in Japan (hereinafter the "Tartu Paper"). The Tartu Paper discusses a second activation with steam at high temperatures ranging from 950° C. to 1150° C. for 2.5 hours. At 1050° C., this second activation nearly doubled total pore volume, more than doubled mesoporosity, and increased BET surface by a reported 65%. Each of these metrics is conventionally desirable, and the increases are large. But the disappointing result with working two-electrode EDLC devices, given in Table 2 and in FIG. 7 of the Tartu Paper, was that no significant improvement in carbon specific capacitance over RP-20 alone was seen.

Another previous effort (also focused on mesoporosity rather than rugosity) that combined chemical and physical activation together in one step did not produce a better material. A Taiwanese research group published results of simultaneous chemical KOH activation and physical activation with carbon dioxide. In the Journal of Power Sources 159 (2): 1532-1542 (2006) (hereinafter "JPS 2006") the results on fir wood char were described. In Electrochimica Acta 52 (7): 2498-2505 (2007) (hereinafter "EA 2007") the results on pistachio nutshell char were described. In both papers, unactivated but carbonized char was mixed with an equal weight (1:1) of KOH, then activated for 60 minutes at 780° C. under inert nitrogen. Conventionally, KOH activation under inert $N_2$ is done on previously carbonized material as described by U.S. Pat. No. 5,877,935 and U.S. Pat. No. 7,214,646. At intervals of the 60-minute processing time, ranging from immediately to never, carbon dioxide was also introduced. This procedure resulted in materials that were only KOH activated for 60 minutes, and materials that also had simultaneous carbon dioxide activation for periods of 15, 30, or 60 minutes. The stated purpose of this procedure in both papers was to increase the proportion of mesopores, since "KOH activation is mainly used to etch char to form micropores" and "$V_{meso}$ is directly proportional to the $CO_2$ gasification time." The highest reported specific capacitance for this combined activation in either paper was 197 F/g using sulfuric acid as the electrolyte. By way of comparison, the commercial specification for simple standard Kuraray RP (BP) 15 is a specific capacitance of 236 F/g in sulfuric acid. Both papers also found an unusual and disappointing result that capacitance actually decreased with increasing $CO_2$ time despite substantial increases in total BET surface and mesoporosity. JPS 2006 expressly considered the results to be an abnormal phenomenon and attributed causality to redox pseudocapacitance. EA 2007 contained a similar discussion. Both papers go on to discuss the potential usefulness of longer duration simultaneous $CO_2$ activation in partial removal of these supposed surface functional groups, since they may increase resistivity and may result in undesirably high self-discharge. However, one of skill in the art would recognize that the constant current charge discharge plots of JPS 2006 FIG. 6 are linear (except very near maximum voltage where the cyclic voltammograms also show a redox peak attributable to electrolyte breakdown) so that little redox pseudocapacitance is involved. Rather, the decline can be attributed to deterioration in surface rugosity with increasing duration of concurrent activation. Similar declines can be inferred for increasing KOH activation alone. See Carbon 40: 2616-2626 (2002) and J. Electrochem. Soc. 151: E199-E205 (2004).

Another carbon consideration is chemical purity. In certain critical filtration applications, for example pharmaceuticals, carbon impurities may undesirably leach into the filtrate. Therefore, it is common that activated carbons are sold in at least two grades, As Activated, and Acid Washed to remove impurities. It is conventionally thought that residual metal ion impurities may undesirably introduce faradic electrochemical redox shuttles, thereby increasing self-discharge and reducing stored charge over time. See, for example, Fujino et. al. in Proceedings of the 15th International Seminar on Double Layer Capacitors pp. 79-80 (2005). A conventional means to remove such electrochemical impurities is acid washing. See, for example, J. Electrochem. Soc. 149 (7) A855-A861 (2002).

Another option is to use purified precursors. See, for example U.S. Pub. No. 2005/0207962 (for purified carbohydrate precursors, e.g. refined sucrose), or U.S. Pat. No. 6,660,583 (for a chemically refined synthetic petroleum pitch precursor). Refined precursors such as sugars or petroleum derivatives are often obtained in bulk form. Smaller particles increase relative exterior surface. In order to achieve smaller, usable particle sizes, the bulk material must be milled to a desired final particle size distribution. This is conventionally done after activation for material handling convenience and cost reasons. See, for example, U.S. Pat. No. 7,214,646. This practice results in particles having exterior cleavage surfaces (milled fragments of the former larger activated particles) with less rugosity than an activated exterior surface. For high-resolution surface image comparisons, see, for example, Economy, Proceedings of the 8th Polymers for Advanced Technology International Symposium, Budapest 11-14 Sep. 2005.

BRIEF SUMMARY OF THE INVENTION

The scope of the present invention is defined solely by the appended claims, and is not affected to any degree by the statements within this summary.

In order to address these issues, there is a need for a way to prepare activated carbons with a high energy density. There is also a need for precursor materials that will yield activated carbons with a high energy density. There is a further need for improved control of nanoparticle catalyzed mesopore formation in carbons.

Thus, according to one embodiment, there is a method for forming an activated carbon. A carbon precursor material is coated with a phosphorus based chemical solution to form a coated material, and the coated material is physically activated to form an activated carbon.

In another embodiment, a method of forming an activated carbon is provided. A green carbon precursor is coated with a chemical solution that chemically reacts with carbon to form a coated carbon material. The coated green carbon material is carbonized. The coated carbon material is physically activated during at least a portion of the carbonizing step to form an activated carbon.

In yet another embodiment, there is a method of forming an activated carbon. Milled particles are formed by milling a carbon material to a predetermined particle size prior to activation. The milled particles are then activated, forming activated carbon particles.

In another embodiment, a method of forming an activated carbon is disclosed. A carbon is provided which is either a carbon or a carbon precursor and is coated. If the carbon is a carbon precursor, the precursor is carbonized to form a carbon. The carbon is then catalytically activated in air and an inert gas to form a catalytically activated carbon. The mass of the catalytically activated carbon is lower than the mass of the carbon. An activated carbon is formed by physically activating the catalytically activated carbon in steam or carbon dioxide. The mass of the activated carbon is lower than the mass of the catalytically activated carbon. Further, the activated carbon is mesoporous.

In yet another embodiment, a method of forming an activated carbon is disclosed. In the method, a previously first activated carbon is activated to form a second activated carbon wherein capacitance of the second activated carbon is at least 20% greater than capacitance of the first activated carbon.

In another embodiment, a method of forming an activated carbon is disclosed. In the method, a previously chemically activated carbon is physically activated to form a second activated carbon wherein capacitance of the second activated carbon is at least 80 F/g.

BRIEF DESCRIPTION OF THE DRAWINGS

FIG. 17 contains photographs showing rugose surface features catalytically etched into carbon fiber utilizing coating with metal acetylacetonates followed by activation by air and an inert gas, or followed by steam activation.

FIG. 19 contains photographs showing rugose surface features catalytically etched into carbon fiber utilizing coating with metal acetylacetonates followed by activation by air and an inert gas, then followed by steam activation.

DETAILED DESCRIPTION OF THE INVENTION

Figure 1:
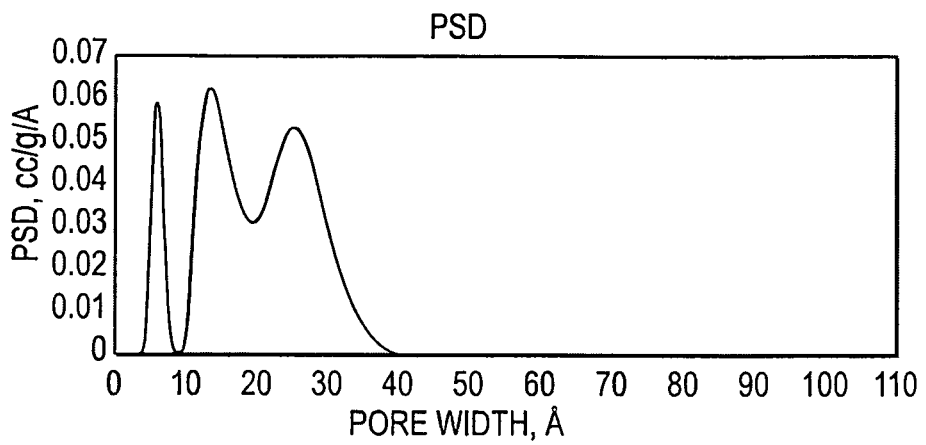
FIG. 1 is a graph showing the pore size distribution of a mesoporous compound activated carbon according to Example 1.

Enhanced methods for preparing activated carbons have been discovered and are described herein. The enhanced methods focus on several aspects of the preparation of activated carbons, including precursor selection, precursor milling, control of mesoporosity, compound activation utilizing catalytic coating, and multi-stage activation techniques. Those of skill in the relevant art will realize that activated carbons with enhanced rugosity, mesoporosity, energy density and/or power density may be prepared utilizing one or more of the embodiments described herein, or combinations of portions of disclosed embodiments.

Definitions

The term "rugosity" used in reference to carbons refers to the difference between actual surface area and theoretical geometric area in accordance with the definition in the IUPAC Compendium of Chemical Terminology, $2^{nd}$ edition (1997). For example, the sand side of a sheet of ordinary sandpaper has substantially higher rugosity than the paper side.

The term "particle" used in reference to precursors and activated carbons refers to a distribution of materials conventionally from about 1 micron to more than 100 microns in diameter. Such particles can be conventionally prepared prior to and/or after physical or chemical activation, as described, for example, in U.S. Pat. No. 5,877,935, U.S. Pat. No. 6,643,119 and U.S. Pat. No. 7,214,646.

The phrase "fiber" used in reference to polymers and carbons refers to filamentous material of fine diameter, such as diameters less than about 20 microns, and preferably less than about 10 microns. Such fibers can be obtained using conventional solvent or melt spinning processes or by unconventional spinning processes such as electrospinning. Such fibers, when fragmented into short pieces (as with conventional 'milled' carbon fiber at about 150 microns length with aspect ratios of 15 to 30 from fiber diameters conventionally at least 7 microns), as used herein also comprise 'particles'.

The term "bulk" used in reference to the size of precursor materials refers to material that is too large to be commercially useful in a capacitor. Materials with a $D_{50}$ greater than 30 microns are considered to be "bulk" precursor material.

The term "milling" used in reference to producing a particle size distribution refers to any process used for making finer powders from coarser precursor materials, such as ball milling, jet milling, pan milling, and the like. Many milling processes are known to the art and may be used herein.

The term "mesoporous" as used in reference to a carbon describes a distribution of pore sizes wherein at least about 20% of the total pore volume has a size from about 2 nm to about 50 nm in accordance with the standard IUPAC definition.

The phrase "catalytically activated" as used in reference to a carbon refers to its porous surface wherein mesopores have been formed from the external surface of the carbon particle or fiber toward the interior by a catalytically controlled differential activation (e.g., etching) process. In some embodiments, metal and/or metal oxide particles of a chosen average size serve as suitable catalysts and a least a portion of the metal oxides remain in or on the carbon after the activation process.

The phrase "nanoparticle" as used in reference to catalytic particles means a nanoscale material with an average particle diameter greater than 2 nm and less than 50 nm.

Compound Carbon Activation Utilizing Reactive Chemical Coating

In one embodiment, an enhancement to a method for preparing activated carbons involves coating a precursor with a chemistry that chemically reacts with carbon and causes porosity under high-temperature activation in an inert gas, followed by a second activation utilizing an etchant gas at high temperature.

A fibrous precursor's diameter, and thus its exterior/interior proportions, is determined by the fiber itself prior to activation. Fibrous precursors have the further advantage of being easily milled into optimal aspect ratios for electrode power density as disclosed by PCT/US2005/033178 and U.S. Pub. No. 2007/0178310. Fiber milling/sieving processes can be quite gentle since the fiber already has the desired final diameter and only needs to be broken into a desired length distribution. *See, for example, J. Applied Electrochemistry* 35: 1067-1072 (2005). Many precursor materials are capable of being either melt or solvent spun into high purity fibers of fine diameters ranging conventionally from about 7 microns to 20 microns, similar in diameter to the majority of particles in commercial milled electrocarbons. See, for example, *Carbon* 43: 1303-1310 (2005) for activated Kynol carbon fiber, *Carbon* 43: 1533-1545 (2005) for activated melt spun mesopitch fiber, and U.S. Pat. No. 6,643,119 for a typical particle distribution used in making capacitor electrodes.

The precursor carbon may come from any source of sufficient purity (either with or without an additional chemical purification step such as acid washing), including naturally occurring materials such as coals, plant matter (wood, coconut shell, food processing remainders (pulp, pith, bagasse), or sugars), various petroleum or coal tar pitches, specialized pitch precursors such as described in U.S. Pat. No. 6,660,583, or from synthetic polymeric materials such as rayon, Tencel®, polyacrylonitrile (PAN), polyvinyldiene chloride (PVDC), or phenolic novoloid (Kynol), wherein rayon is a lignocellulosic material, which is defined to be a material that contains both cellulose and lignin. The embodiments are not limited thereto but comprises any chemically suitable precursor capable of being carbonized and activated.

Specific capacitance of a finished activated carbon depends in part on preserving activation-induced rugosity in the final electrode material. In one embodiment, a precursor material is first processed to approximately the final desired dimension. For a bulk material, this can be achieved for many materials (such as sugars and mesopitchs) by milling to a desired particle diameter distribution prior to the carbonization/activation processes. Preferably, the final material diameter distribution is achieved by spinning a 'green' precursor into a fiber of suitable diameter. Optionally, said fiber can be milled, preferably after activation (since resulting cleavage faces are not a major consideration) to a final desired aspect ratio particle size distribution in accordance with U.S. Pub. No. 2007/0178310.

In one embodiment, the process generally proceeds in three steps. In another embodiment, the process generally proceeds in two steps if a non-green precursor is used. In a first step, a green carbon precursor, suitably milled or spun, is coated with a chemical solution that chemically reacts with carbon and causes rugosity and porosity under activation. The green precursor is preferably rayon fiber; however, other precursor carbon, as described above, may also be used. The chemical solution that chemically reacts with carbon is preferably a phosphorous based chemical solution; however, arsenic based solutions, metal salts, such as zinc chloride, and bases, such as potassium hydroxide and sodium hydroxide, may also be used. Salts and bases may leave metallic residues that may need to be removed by additional post activation washing steps. Therefore, phosphorous related chemistries are preferred. In one embodiment, the material is submerged into a bath of reactive chemistry for a period of time. After coating the material, the material may be oven or air dried.

In a second step, the chemically coated green precursor is carbonized according to known carbonization methods for particular materials. Preferably, the chemically coated precursor is carbonized using high temperature in an inert atmosphere. High temperature is a temperature that is between about 500° C. and about 1100° C. In one preferred embodiment, the inert atmosphere is inexpensive nitrogen. However, in other embodiments, other inert gases may be used. A degree of chemical activation conventionally occurs during this step.

Optionally, if a non-green precursor is used, such as mesopitch char or coal, the non-green precursor suitably milled is coated with a chemical solution that chemically reacts with carbon and causes porosity under activation as described in the first step above. Thus, the carbonization step is not required if the precursor is a non-green precursor.

In the next step, compound activation is accomplished by the introduction of an etchant gas. An etchant gas is one that causes oxidation of carbons at temperatures typically above 250° C. The etchant gas is preferably carbon dioxide or steam; however, oxygen (as a proportion of air in the nitrogen flow) or carbon monoxide may be used. In one preferred embodiment where a green precursor is used, the etchant gas is introduced after the chemically coated precursor has been carbonized after a period of time. In another embodiment, the etchant gas is introduced during the entire carbonizing step. In an embodiment where a non-green precursor is used, the non-green precursor is coated and heated to high temperature for a period of time prior to the introduction of the etchant gas.

The etchant gas is preferably introduced until a resultant mass loss from the green state of 20% to 85%, more preferably 30% to 70%, and even more preferably 40% to 65% is achieved. In a preferred embodiment, the etchant gas is introduced for less than two hours, and more preferably for less than one hour and a half. The resulting material shows a higher activation surface, higher mesoporosity, and higher specific capacitance, than a comparable material without the chemical coating prior to carbonization/activation.

One skilled in the art will appreciate that total processing time of carbonizing and activating can be accomplished in a relatively short period of time. The total processing time of carbonizing and activating can be about three hours or less and more preferably can be about two and a half hours or less. Where a non-green precursor is used, processing time for activating can be about two hours or less and more preferably can be about one hour or less.

The following comparative examples were measured on a calibrated Micrometrics ASAP 2010.

Comparative Example 1

A green precursor of ordinary rayon fiber uncoated with a reactive chemistry (North American Rayon Corp. Bright 4242, 1630/720/2 oz. filament, hereinafter "Rayon") was carbonized for 60 minutes under $N_2$ at 850° C. The material was then physically activated using steam for 30 minutes at 800° C. The activated material underwent a mass loss of 90%, had a BET surface of 1129 $m^2$/g, a total pore volume (hereinafter TPV) of 0.44564 cc/g, and a DFT micropore proportion of 90.8%. The high mass loss (only 10% of the material remained) yet relatively low BET surface and TPV suggest that such a conventional steam activation regime for this duration is not useful with this material.

Comparative Example 2

The Rayon of Comparative Example 1 was carbonized for 60 minutes under $N_2$ at 850° C. and then physically activated using carbon dioxide for 60 minutes at 850° C. The activated material underwent a mass loss of only 18.7%, had a BET of 760 m²/g, a TPV of 0.3269 cc/g with a DFT micropore proportion of 93.6%. The low mass loss, low BET surface, and low TPV suggest that such a conventional carbon dioxide activation regime for one hour duration is not useful with this material. The measured specific capacitance of the resultant material was found to be only 14.1 F/g. This is too low to be a useful electrocarbon.

Example 1

The Rayon of Comparative Example 1 was submerged in a 5% aqueous solution of diammonium phosphate $((NH4)_2HPO_4$, hereinafter DAP, a common phosphorous derivative used as a plant fertilizer and fire retardant) for 30 minutes. The DAP coated Rayon was then oven dried. The DAP coated Rayon was carbonized/activated for 60 minutes under $N_2$ at 850° C. and then compound activated by adding 200 mL/min $CO_2$ at 850° C. for 60 minutes. The activated carbon mass loss was 83.7%, the BET surface was 2452 m²/g, the TPV was 1.12943 cc/g, and the micropore proportion was only 44.8%. The material was 55.4% mesoporous.

Figure 2:
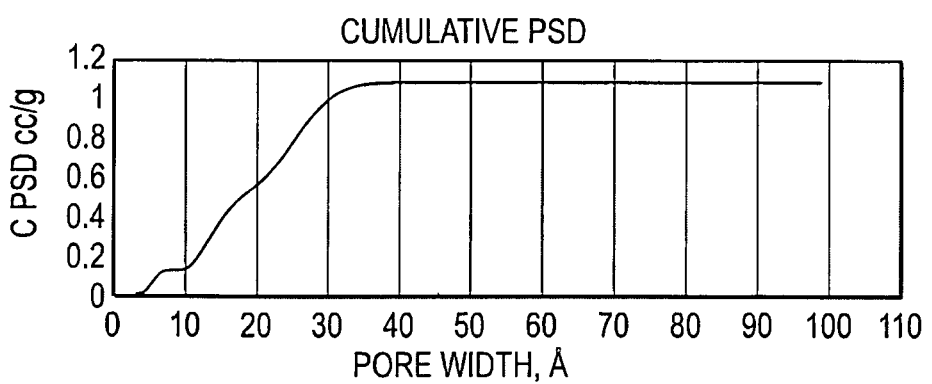
FIG. 2 is a graph showing the cumulative pore size distribution of a mesoporous compound activated carbon according to Example 1.

This is less mass loss than Comparative Example 1, yet much higher surface area (over double), TPV (over double), and desirable mesopore volume and surface (over double). The material also has much more total surface than Comparative Example 2, which utilized carbon dioxide alone, and importantly with a majority of desirable mesopores, as shown by pore size distribution and cumulative pore size distribution plots in FIG. 1 and FIG. 2, respectively. This activated carbon was simply made by coating and about two hours of total processing time at a single temperature. Such a carbon may have high utility as a mesoporous filtration carbon in a filtration system.

Figure 3:
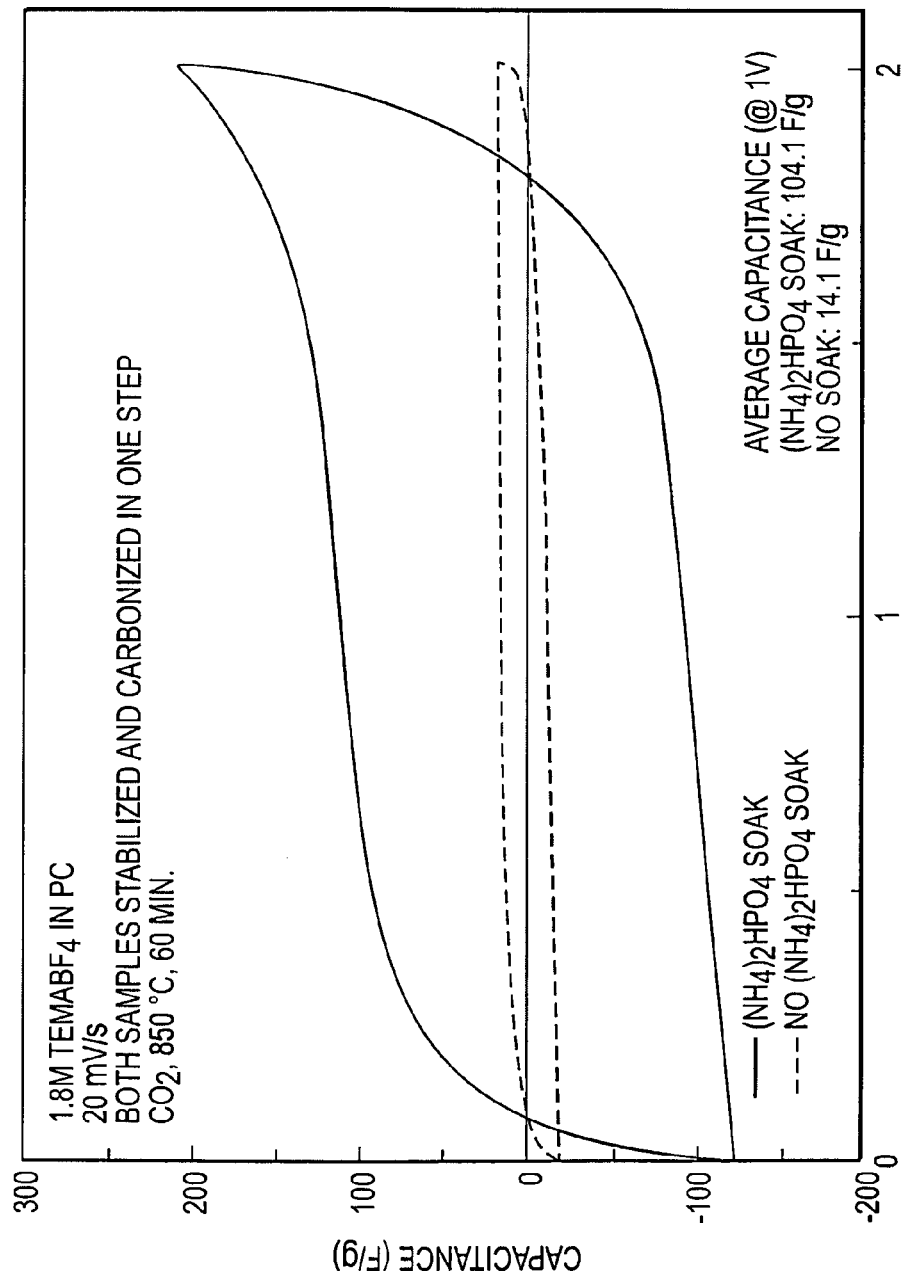
FIG. 3 is a graph showing a cyclic voltammogram of a compound activated carbon according to Example 1 compared to an equivalently activated carbon according to Comparative Example 2.

The carbon of Example 1 is also an excellent electrocarbon. The compound activated fiber was ground into particles, made into electrodes, and tested in a two electrode working double layer capacitor device using TriEthylMethylAmmonium fluoroborate salt in propylene carbonate solvent (1.8 molar TEMA/PC as the organic electrolyte. The cyclic voltammogram (CV) of the working device, measured at sweep rates of 20 mV/s, is shown in FIG. 3. It shows an excellent specific capacitance of 104.1 F/g at one volt, and a desirable rectilinear/parallelogram shape trending toward the electrochemical double layer capacitance ideal.

Results of Comparative Example 2 and Example 1 are summarized in Table 1 below and the cyclic voltammograms of Comparative Example 2 and Example 1 are compared in FIG. 3.

TABLE 1

|  | Comparative Example 2 | Example 1 |
| --- | --- | --- |
| BET | 760 m²/g | 2452 m²/g |
| Total Pore Volume | 0.3269 cc/g | 1.12943 cc/g |
| Capacitance | 14.1 F/g | 104.1 F/g |

The Rayon of Example 1 has a relatively large diameter of about 20 microns, good for filtration carbons but less desirable for electrocarbons. For additional electrochemically useful rugose exterior surface, smaller diameter particles or fibers are desirable; Rayon fiber is easily spun to 0.9 denier (or dtex), a diameter below 10 microns. In the textile industry, materials of 1 denier or less are known as microfibers.

Example 2

Figure 4:
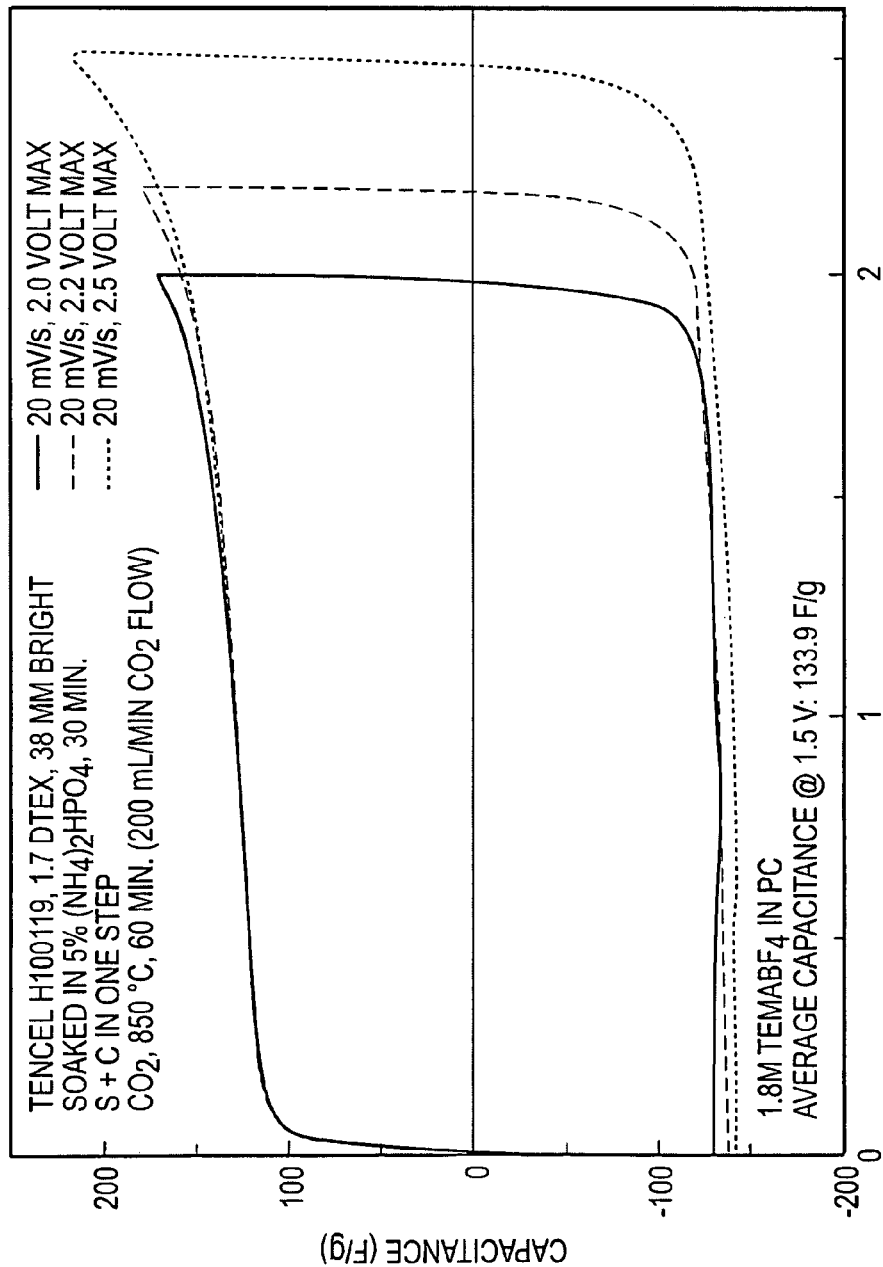
FIG. 4 is a graph showing a cyclic voltammogram of a compound activated carbon according to Example 2.

A Tencel® rayon fiber from Lenzing AG with a preferable smaller average diameter of 12 microns (Tencel H100119, dtex 1.7) was compound activated according to the method of Example 1 to produce an electrocarbon. The mass loss from green fiber was 63.7%, the BET surface was 2134 square meters/gram, the total pore volume was 0.85082 cc/g, and the mesopore proportion was 19.3%. The material's specific capacitance in working devices with 1.8 molar TEMA/PC electrolyte was 133.9 F/g at one volt of charge, with a near ideal CV as shown in FIG. 4. Results of Comparative Example 2 and Example 2 are summarized in Table 2 below.

TABLE 2

|  | Comparative Example 2 | Example 2 |
| --- | --- | --- |
| BET | 760 m²/g | 2134 m²/g |
| Total Pore Volume | 0.3269 cc/g | 0.85082 cc/g |
| Capacitance | 14.1 F/g | 133.9 F/g |

Figure 5:
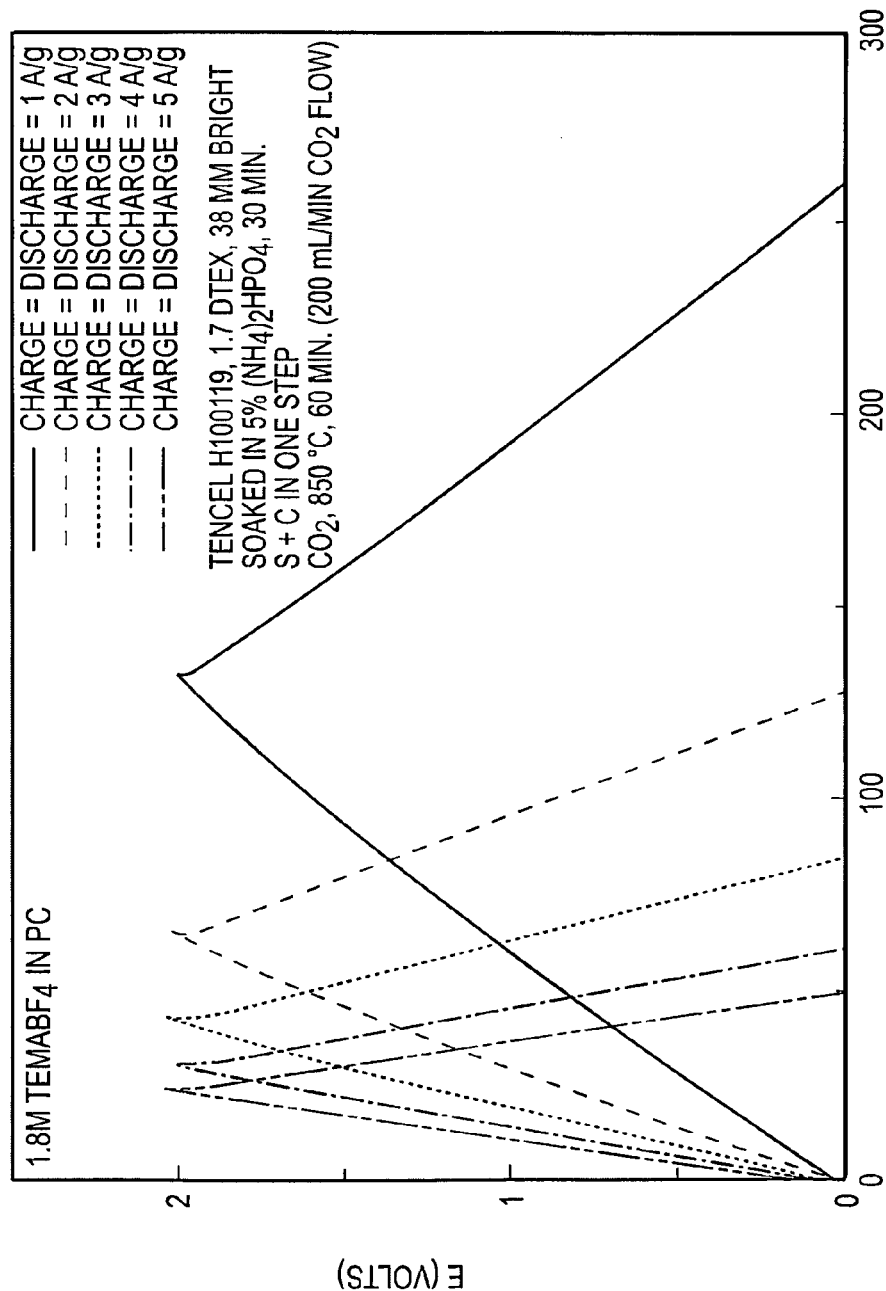
FIG. 5 is a constant current charge/discharge graph of a compound activated carbon according to Example 2.

Constant current charge discharge tests were run for devices made with the material of Example 2 at high current densities of up to 5 A/g. The results of these tests are shown in FIG. 5. The tests demonstrate to one of skill in the art that true double layer capacitance is exhibited by the compound activated material of Example 2 even at high current densities. The substantial straightness of the charge/discharge curves indicates true double layer capacitance.

Figure 6:
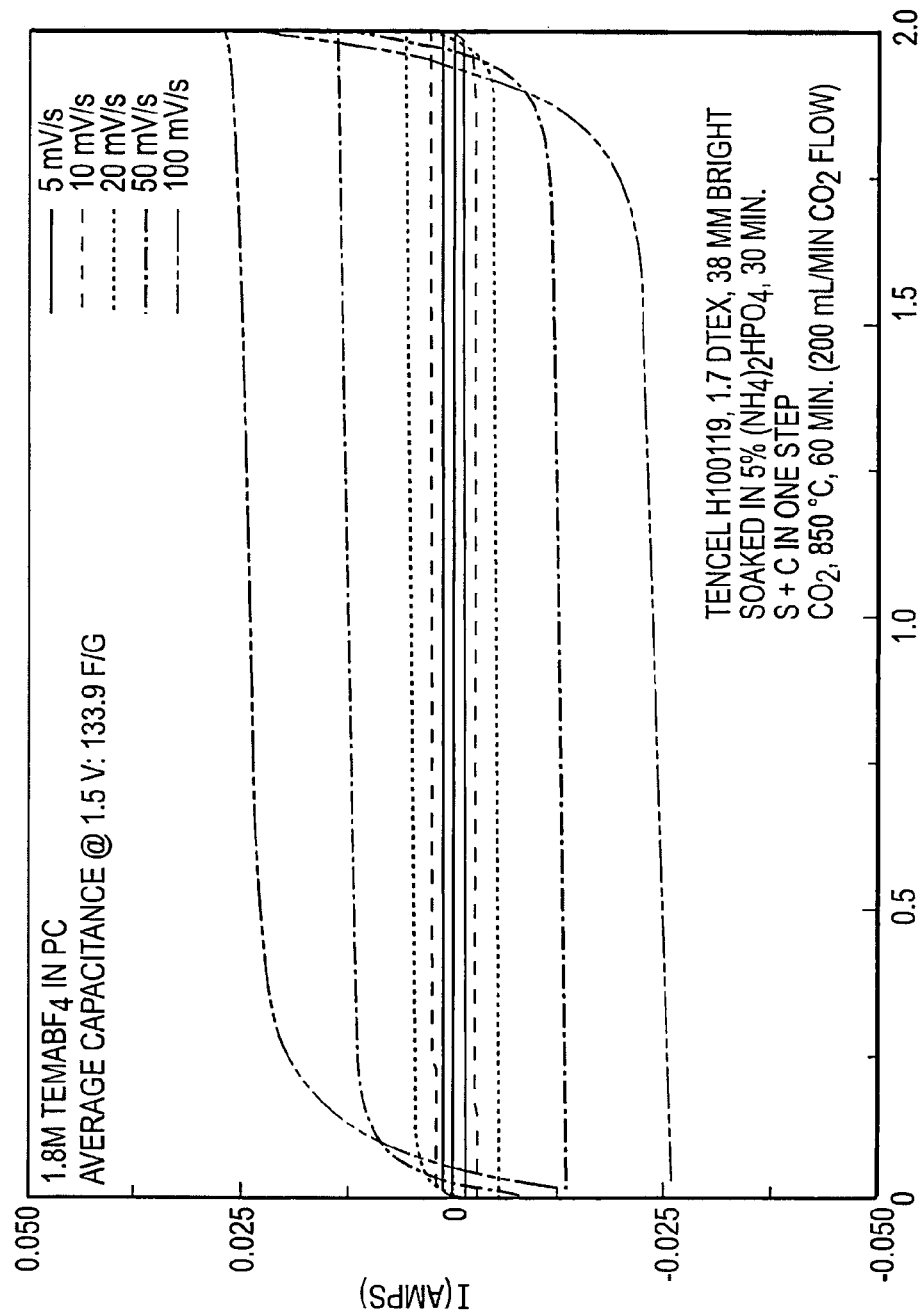
FIG. 6 is a graph showing cyclic voltammograms at varying sweep rates of a compound activated carbon according to Example 2.

Cyclic voltammograms were also run for devices made with the material of Example 2 to sweep rates as high as 100 mV/s. The results of these tests are shown in FIG. 6. The tests demonstrate to one skilled in the art that the compound activated material of Example 2 maintains its power dense high capacitance and near ideal rectilinear/parallelogram shape even under rapid voltage changes in aprotic electrolytes, unlike most other activated carbons. One skilled in the art will appreciate that the substantially rectilinear shape indicates that the material is substantially power dense.

Example 3

Tencel rayon fiber dtex 1.7 as in Example 2 was compound activated as in Examples 1 and 2. However, the activation time with carbon dioxide was increased to 75 minutes at 850° C. The mass loss from the green fiber was 71.3% (more than in Example 2 due to the longer activation time), the resulting BET surface was 2307 square meters per gram (only 8% more than Example 2), the total pore volume was 1.07 cc/g (desirably 25% more than Example 2), and the mesopore proportion was 45% (desirably 25.7% more than Example 2). Specific capacitance of the resulting material was 160.1 F/g measured at 20 mV/s at 1.5 volts of charge, and 156.5 F/g at 1.0 volts of charge. Linear constant current charge discharge curves to 2.5 amperes/g indicate true double layer capacitance, and impedance spectroscopy showed a surprising small region of Warburg impedance on the Nyquist plot, indicating excellent mass transport and very high power density despite the very high energy density.

While many carbon precursors may be utilized in the embodiment, rayon has several particular advantages. Rayon is reconstituted cellulose made from wood pulp. As such, it is one of the cheapest synthetic fiber classes. Rayon is also a preferred precursor because it is already chemically purified, thus avoiding an acid washing step. As a fiber, Rayon does not require traditional potentially destructive milling to achieve a particle size, as only crushing and optionally air classifying may be required to achieve a desired length distribution.

Reconstituted cellulose products can be made in several ways. The three more popular processes are the cellulose acetate process (acetate fabrics) the viscose rayon process discovered in 1894 (rayon fabrics in the US, viscose fabrics elsewhere), and most recently the lyocell process using N-methyl morpholine N-oxide (NMMO) (Tencel® fibers). The differences between the processes are the solvent for the wood pulp cellulose, and the reactant for the post spinning solidification of the fiber.

Figure 18:
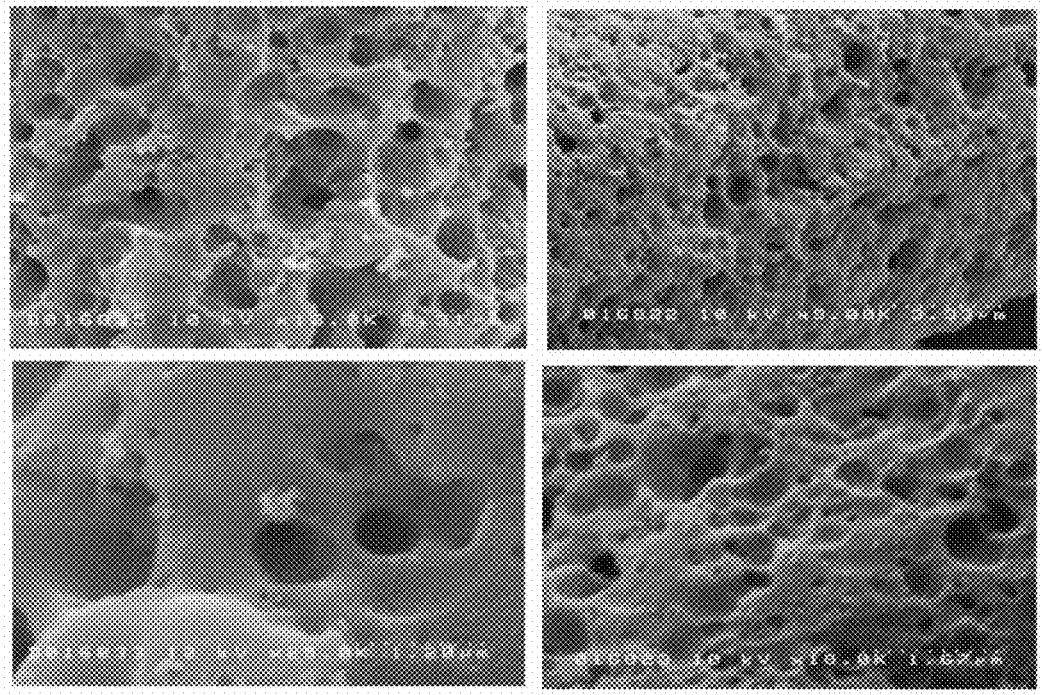
FIG. 18 contains photographs showing rugose surface features catalytically etched into carbon fiber utilizing coating with metal acetylacetonates followed by activation by air and an inert gas.

The resulting reconstituted cellulose products have different properties. Lyocell exhibits fibrillation, where nanofibers project off the surface of the main fiber, that can result in pilling of fabrics over time. A fibrillar micro-structure is also evident in the structure of the main fiber, a feature that viscose does not exhibit. See H. Fink, P. Weigel, H. J. Purz, J. Ganster, Structure formation of regenerated cellulose materials from NMMO-solutions, Prog. Polym. Sci. 26 (2001) 1473, FIG. 18. The laminar cellulose crystallite bundles in the lyocell may be between 25 nm and 50 nm diameter, depending on process conditions, which is preferable for electrocarbon activation. Therefore, under equivalent carbonization and activation conditions, a lyocell fiber will produce a slightly higher specific capacitance than a viscose fiber because of the intrinsic microstructure of the green precursor.

Example 4

As experimental support, 1.0 dtex (9-10 micron) MicroModal fiber (viscose) and 0.9 dtex (8-9 micron) MicroTencel (lyocell) from Lenzing, both fibers made in Austria, were obtained. Under identical compound activation processing conditions, (30 minute soak in 5% DAP, oven dry, stabilize and carbonize in one step at 850° C., then activate for 90 minutes with $CO_2$ at 200 ml/min at 850° C.), the MicroModal measured 116 F/g while the MicroTencel measured 128.7 F/g at 1.5V on CVs using a 20 mV/s sweep rate, demonstrating the advantage of the lyocell microstructure as a precursor.

Example 5

As experimental support to demonstrate the exterior surface effect of dtex (fiber diameter, desirably smaller) and its corresponding impact on specific capacitance, Tencel fibers of 0.9, 1.25, 1.4, and 1.7 dtex were processed utilizing the same compound activation conditions (30 minute soak in 5% DAP, oven dry, stabilize and carbonize in one step at 850 C, $CO_2$, activate for 90 minutes at 850° C.). The capacitances in identically made cells measured are shown in Table 3:

TABLE 3

| Dtex | F/g |
| --- | --- |
| 0.9 | 128.7 |
| 1.25 | 126.2 |
| 1.4 | 120.7 |
| 1.7 | 102.2 |

Therefore, in one embodiment, finer rayon may be preferable, and finer lyocell may be more preferable, as a carbon precursor.

Widely available high purity, fiber precursor materials, may be utilized with a single compound activation regime using simultaneous chemical and physical means in order to produce enhanced activated carbons. In this embodiment, specific capacitance over 120 F/g can be obtained in a single compound activation step from high purity uncarbonized precursors. This embodiment utilizes a simplified process, improves capital utilization, lowers energy costs, and eliminates an acid wash purification process for the precursor.

Following the examples above, one of skill in the art would recognize without undue experimentation that by varying the precursor chemistry, chemical coating concentration, carbonization time and temperature, and compound activation time, temperature, and reactive gas concentration, a wide range of activated carbons having different useful properties may be simply and quickly made in this fashion.

Sequential Carbon Activation

In another embodiment, another sequential activation process of chemically activated carbon, preferably using standard phosphoric acid means for the first activation, and subsequently applying a second sequential activation using physical means, preferably steam, produces electrocarbons with more than 100 F/g in organic electrolytes.

A combination of standard (phosphoric acid) chemical activation followed by a moderate period of moderate temperature physical (such as steam or $CO_2$) activation produces inexpensive carbons which perform electrochemically as well as alkali activated materials, as well as standard RP-20, and substantially better than either simple phosphoric acid activated or simple physically activated filtration carbons.

Conventional phosphoric acid activated filtration carbons, such as those produced by Norit, are made at about 500° C. for just "a few hours" compared to its steam activated electrocarbons made at temperatures above 800° C. for "several hours to several days". In comparison, total processing times for this sequential activation process are not only less than for steam activated electrocarbons, but also less than for alkali chemical activation (see, for example, U.S. Pat. No. 5,877,935 disclosing up to 20 hours at from 500° C. to 1000° C., with the best materials produced at temperatures of from 800° C. to 900° C. with activations from 3 to 5 hours), at generally lower temperatures, and without additional processing steps (see, for example, U.S. Pat. No. 7,214,640 for pre and post alkali activation steps). The reduced processing time is of utility in lowering electrocarbon cost.

The precursor carbon particles or fibers may come from any source of sufficient purity (either with or without an additional chemical purification step such as acid washing), including naturally occurring materials such as coals, plant matter (wood, coconut shell, food processing remainders (pulp, pith, bagasse), or sugars), various petroleum or coal tar pitches, specialized pitch precursors such as described by U.S. Pat. No. 6,660,583, or from synthetic polymeric materials such as polyacrylonitrile (PAN) or polyvinyldiene chloride (PVDC). In one embodiment, rayon fabrics or fibers created using the viscose process may be utilized. In another embodiment, Tencel® fabrics or fibers created by the lyocell process may be utilized. The precursor may be chosen utilizing any of the methods or considerations described herein in other embodiments. The embodiments may utilize any chemically suitable precursor capable of being carbonized and activated.

As previously discussed, alkali activation is conventionally found to produce enhanced specific capacitance despite the fact that pore size distributions and average pore sizes of resulting materials are not substantially different than for other activation processes. In contrast, conventional physical activation produces rugosity principally on a different scale. At least some surface rugosity features from the two different classes of activation processes differ by at least one order of magnitude. These exterior features can be combined by sequential activations to enhance rugosity, provided the sequence order is large features before small features. Without wishing to be bound by theory, this sequential activation substantially increases not only rugosity but also total usable surface or "proximate exterior" as defined in PCT/US2007/004182. In effect, the two separate rugose feature size scales created by two different activation processes can be used sequentially to create relatively smaller sized bumps and holes onto and into relatively larger sized bumps and holes. In one embodiment, two separate rugose feature sizes of at least one order of magnitude in difference can be combined by putting about 10 nm sized bumps and holes onto and into over 100 nm sized bumps and holes. In another embodiment, bump and hole features having an average size of between about 1 nm and about 100 nm that are created by a physical activation process can be created on bump and hole features having an average size of greater than about 100 nm that are first created by a chemical activation process. The sequence must be done in the correct order and at appropriate temperatures and durations so as not to destroy more features than created. It follows directly from this explanation of the embodiment that chemical followed by chemical, or physical followed by physical, activation will not generally produce this surprising result. Nor may extreme second physical activation conditions that might erode first activation features.

The first activation preferably uses chemical means; however other activations processes may also be employed. One of skill in the art would be familiar with appropriate times and temperatures for any particular carbon precursor and activation process in order to achieve desired activation. For example, for a detailed discussion of appropriate times and temperatures for particular carbon precursors and processes, see U.S. Pat. No. 6,660,583, U.S. Pub. No. 2005/0207961 and Proceedings of $16^{th}$ ISDLC: 95 (2006). A desired activation preferably is one where activation is stopped at a point where volumetric capacitance no longer increases. Lower activation temperatures and shorter activation times are preferred. Other activation characteristics may also be desired. Preferably, a simple phosphoric acid activation is employed in the first activation process. The first activation also preferably results in creating a surface having bumps and holes having an average size of greater than about 100 nm on a substantial portion of the surface of the material.

The second activation preferably uses physical activation to further increase rugosity, proximate exterior, interior carbon mesoporosity, and total surface of the particle or fiber. Physical activation may be accomplished by simple steam activation, carbon dioxide activation, or any other suitable physical activation process. The second activation preferably results in forming bumps and holes having an average size of less than about 100 nm on a substantial portion of the surface of the previously activated material. Preferably, moderate steam or carbon dioxide activation is employed. Only moderate activation is preferred to prevent destruction of surface features created by the first activation. In this regard, the maximum temperature and duration of the second activation may be selected according to known temperature and duration parameters for activation of the subject material according to the second activation process wherein the parameters chosen are for activation up to a point where volumetric capacitance no longer increases. Activation beyond that point may cause features created by the first activation to be destroyed. It has been observed that activation to a point before the point where volumetric capacitance no longer increases provides an optimal second activation wherein features created by the first activation are preserved and smaller features created by the second activation are formed.

A material that is sequentially activated according to the present embodiment can have 20% or greater increased capacitance as compared to the singly activated carbon, without a substantial increase in BET or mesoporosity. As a result, standard and relatively inexpensive precursor materials, such as white oak, Rayon or Nuchar®, can be inexpensively activated in a second process to produce capacitance in excess of 80 F/g.

Comparative Example 3

To quantify experimentally one embodiment, ordinary hardwood charcoal was used as the precursor carbon. Simple steam activation of ground precursor charcoal ($D_{50}$ 144.1 microns) activated with standard 30% steam/$N_2$ at 700° C. for 1 hour produced a material with a BET surface of 790 $m^2/g$ and a total pore volume of 0.396 cc/g that was 63.8% micropore. Pore volume and percentage micropore and mesopore were measured using DFT on a Micromeretics ASAP 2010. This steam activated carbon was made into a two electrode symmetric carbon/carbon ultracapacitor cell using 1.8 molar TEMA/PC electrolyte. Specific capacitance of the functional EDLC device, measured using a 20 mV/s sweep rate up to 2.0 volts, was only 40.9 F/g. Such a low value is expected from the comparatively low total surface area, high micropore proportion, and comparatively large particle size (which basic Euclidian solid geometry teaches reduces exterior surface and increases interior relatively inaccessible volume and pore surface). Achieving a reasonable electrocarbon as described by Norit (*see Norit, Proceedings of $16^{th}$ ISDLC*: 95 (2006)) would have taken many hours of careful activation, and electrodes made of smaller particles.

Comparative Example 4

As an alternative baseline, white oak hardwood was simulataneously carbonized and chemically activated with $H_3PO_4$ (phosphoric acid) and ground to a $D_{50}$ of 75.3 microns to yield a BET surface of 1396 $m^2/g$, and a DFT total pore volume of 1.053 cc/g of which 29.9% was micropore. Fabricated into an equivalent 2 electrode cell measured under the same conditions as the steam activated charcoal, this singly activated material measured specific capacitance of 58.5 F/g. This difference from the steam activated charcoal is conventionally to be expected from the higher total surface and total pore volume, lower micropore proportion, and smaller (although still comparatively large) particle size.

Unsurprisingly, neither singly activated carbon is a viable commercial electrocarbon. Those typically have specific capacitance ranging from at least 80 to over 100 F/g. (*See for example Norit, Proceedings of $16^{th}$ ISDLC*: 101-102 (2006), and MeadWestvaco (MWV), *Proceedings of 16th ISDLC:* 139-140 (2006)), with median particle size around 8 microns.

Example 6

The phosphoric acid activated hardwood charcoal of Comparative Example 4 was subjected to a second activation in 30% steam at 800° C. for 30 minutes. The resulting sequentially activated BET surface increased only 11%, to 1554 m$^2$/g, while the (desirable) total pore volume decreased 6.8% to 0.981 cc/g and the (undesirable) micropore proportion increased 16% to 34.8%. Particle size remained essentially unchanged. Despite having undesirably large median particles around 75 microns, the specific capacitance of this sequentially activated carbon, made into an equivalent working cell tested the same way, was 97.1 F/g. The nearly 66% improvement cannot be explained conventionally by change in BET surface, total pore volume, or mesoporosity. The improvement follows directly from the importance of rugosity and proximate exterior. The sequentially activated material is an excellent electrocarbon comparable to those from Norit and MWV despite its large particle handicap.

Figure 7:
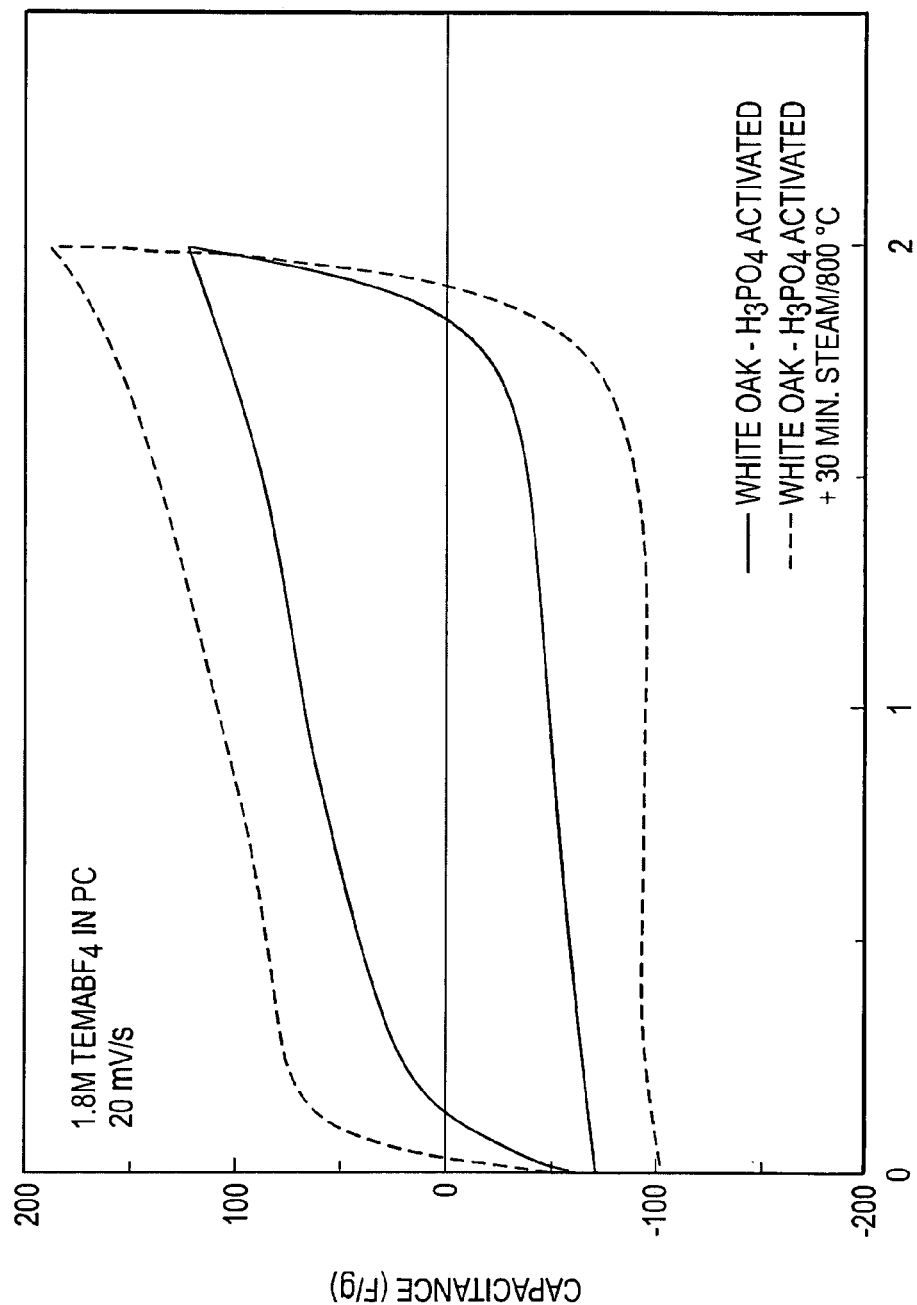
FIG. 7 is a graph showing a comparison of cyclic voltammograms between a singly activated carbon and a sequentially activated carbon.

As can be seen in FIG. 7, the comparison cyclic voltammograms (CV) of working cells from this sequentially activated material compared to cells using just the phosphoric acid activated material demonstrates the utility of sequential activation in the correct sequence using suitable moderate conditions. Unlike the conventional wisdom that this result should be attributable to substantially increasing BET surface and mesoporosity, the BET surface with sequential activation in this experiment only increased from 1396 m$^2$/g to 1554 m$^2$/g, while the mesoporosity surprisingly decreased from 69.5% of 1.0528 cc/g to 65.1% of 0.9811 cc/g. The rectilinear CV and the linear constant current charge/discharge plots for the sequentially activated material also demonstrate to those skilled in the art that double layer capacitance is measured, un-confounded by large proportions of various forms of redox pseudocapacitance, or battery like ion intercalations. Results of Comparative Example 3, Comparative Example 4 and Example 6 are summarized in Table 4 below.

TABLE 4

| [White Oak Precursor] | Steam Only | H$_3$PO$_4$ Only | H$_3$PO$_4$ + Steam |
|---|---|---|---|
| BET | 790 m$^2$/g | 1396 m$^2$/g | 1554 m$^2$/g |
| Total Pore Volume | 0.396 cc/g | 1.053 cc/g | 0.981 cc/g |
| Capacitance | 40.9 F/g | 58.5 F/g | 97.1 F/g |

Additionally, the second physical activation of the phosphoric acid activated hardwood produces surprising results when compared with the test results of the second activated carbon by the Tartu Paper. Tables 5 and 6 below illustrate the differences in the test results.

TABLE 5

| [White Oak Precursor] | 1$^{st}$ Activation | 2$^{nd}$ Activation | % Change |
|---|---|---|---|
| BET | 1396 m$^2$/g | 1554 m$^2$/g | 11.3% |
| Total Pore Volume | 1.053 cc/g | 0.981 cc/g | -6.8% |
| Capacitance | 58.5 F/g | 97.1 F/g | 69.5% |

TABLE 6

| [Tartu Paper RP-20 Precursor] | 1$^{st}$ Activation | 2$^{nd}$ Activation | % Change |
|---|---|---|---|
| BET | 1358 m$^2$/g | 2240 m$^2$/g | 64.9% |
| Total Pore Volume | 0.79 cc/g | 1.46 cc/g | 84.8% |
| Capacitance | 111.5 F/g | 115.7 F/g | 3.7% |

As can be seen from the above tables, sequential activation according to the present embodiment produces a substantial increase in capacitance with a relatively small increase in BET. In contrast with the Tartu Paper prior art reference where using steam activation following steam activation, a substantial increase in BET resulted in a relatively small increase in capacitance.

Example 7

Figure 8:
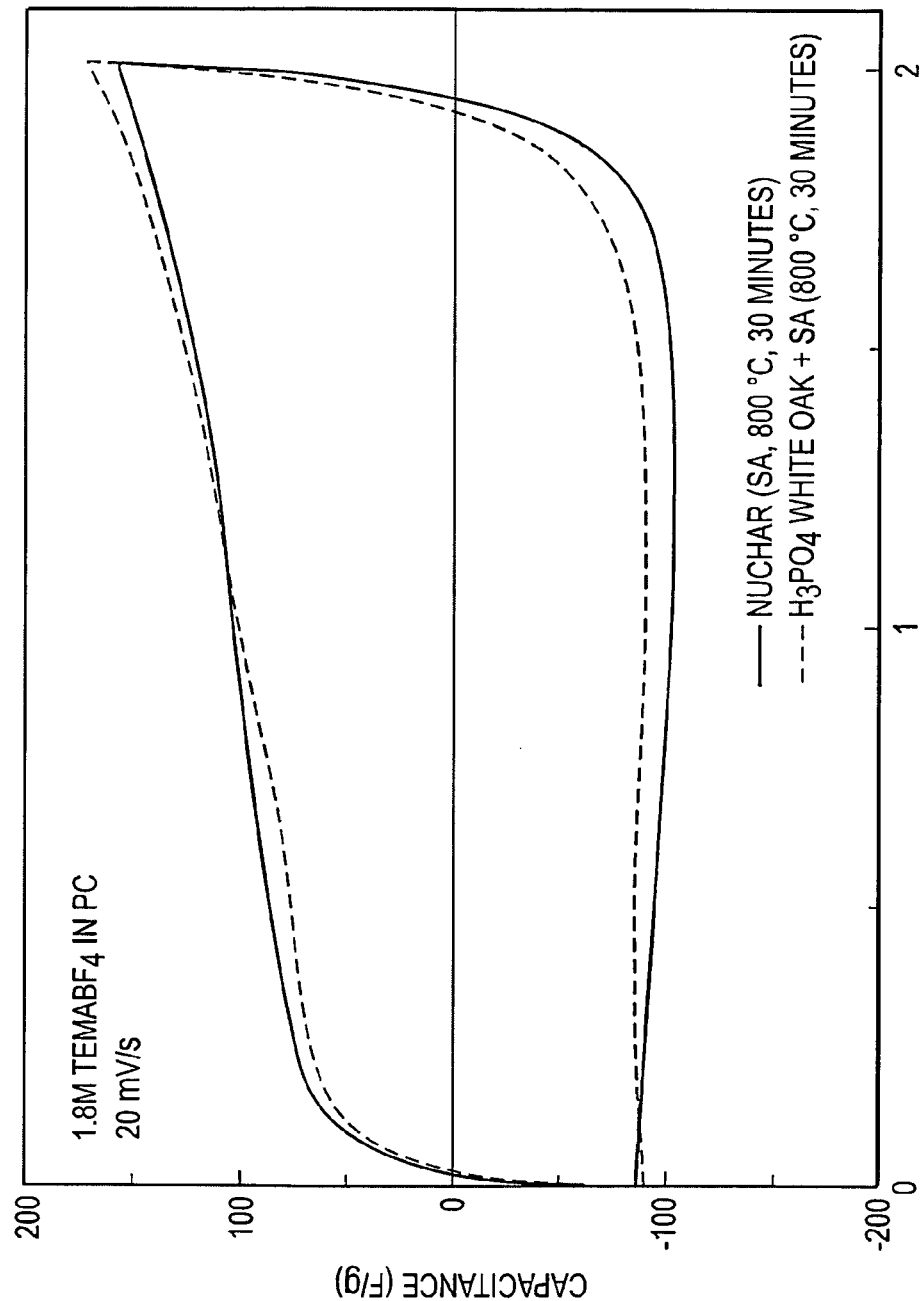
FIG. 8 is a graph showing a comparison of cyclic voltammograms between sequentially activated carbons.

In a second experiment, ordinary (inexpensive) commercial MeadWestvaco Nuchar® chemically activated filtration carbon (MeadWestvaco Corp., Covington, Va.) was subjected to a second steam activation at 800° C. for thirty minutes. As shown in FIG. 8, this sequentially activated carbon had specific capacitance over 100 F/g (102.5 F/g measured at 1 volt using a sweep rate of 20 mV/s). Again contrary to conventional wisdom, the BET surface only increased from 1329 m$^2$/g in the as-received Nuchar® to 1511 m$^2$/g after sequential activation, while the mesoporosity only changed from 61.9% of 0.88 cc/g to 60.5% of 0.97 cc/g. The surprising result is that ordinary low cost filtrations carbons can be further inexpensively processed according to this process to produce excellent electrocarbons. This is clearly seen by comparison of the CV's of test devices made from the two sequentially activated carbons, shown in FIG. 8.

Example 8

Figure 9:
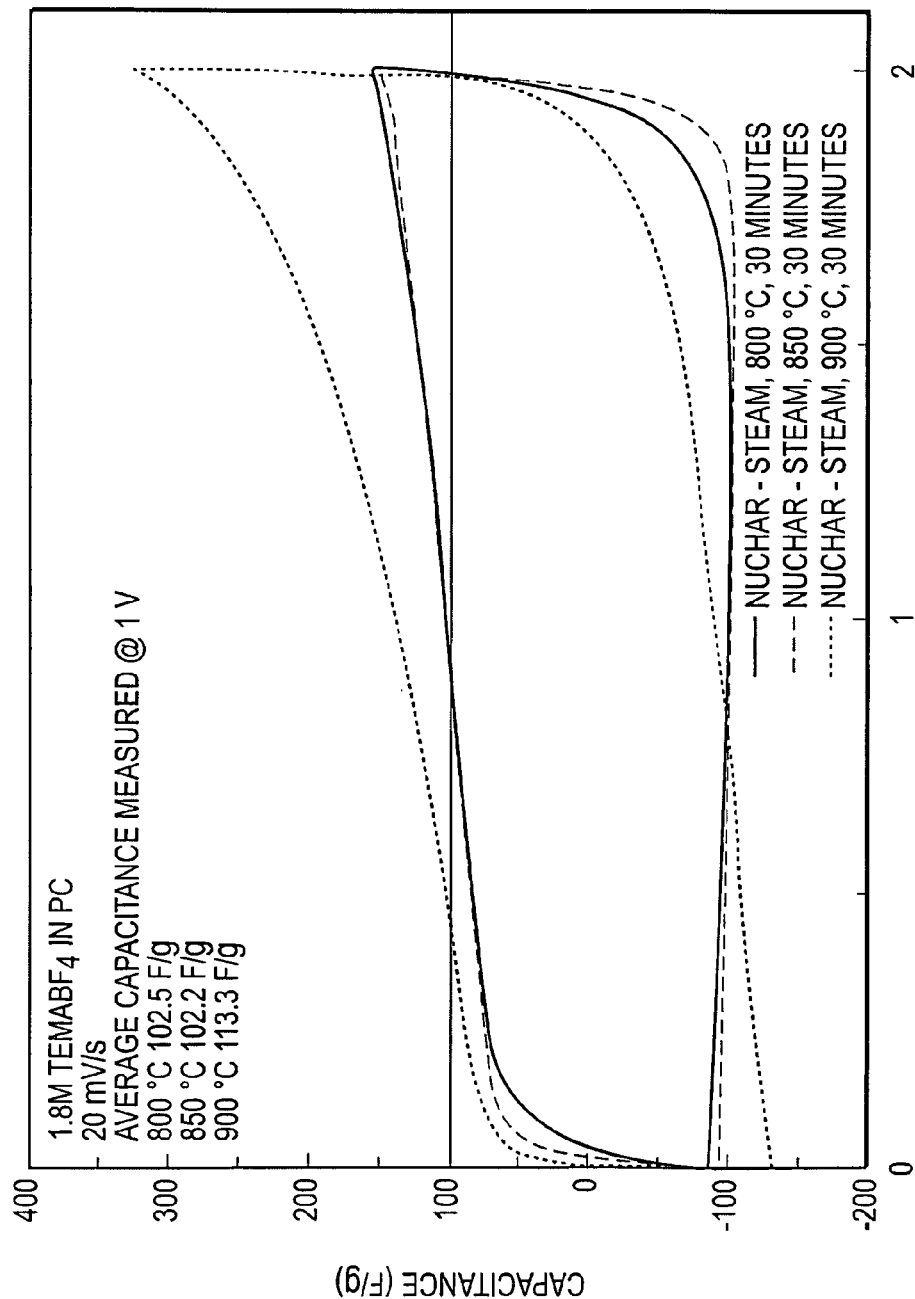
FIG. 9 is a graph showing a comparison of cyclic voltammograms among sequentially activated carbons at different processing temperatures.

In a third experiment, the second activation conditions of Example 7 were changed from 800° C. to 850° C. for 30 minutes. As shown in FIG. 9, the specific capacitance of a cell made from the 850° C. material was 102.2 F/g, as compared to 102.5 F/g for the cell made from 800° C. material. This is in effect no change.

Example 9

In a fourth example, the second activation conditions of Example 7 were changed to 900° C. for 30 minutes. The resulting material had a very high BET surface of 2543 m$^2$, a very high total pore volume of 2.35876 cc/g, and a very low 17.8% micropore proportion. The mass loss caused by this extreme second activation was also very high, 90.8%. The high porosity and small amount of remaining connective carbon is conventionally found to make such a material resistive, undesirably raising the equivalent series resistance (ESR) of working devices. As shown in FIG. 9, the specific capacitance of the working cell made from the 900° C. carbon was only 113.3 F/g, as expected in accordance with the foregoing theoretical explanations. One of skill in the art would also readily recognize that the cell had substantial undesirable ESR as shown by the upward slant of the CV. See, for example, *Carbon* 39: 937-950 (2001) at 940. This experiment demonstrates that relatively mild second activations, rather than more extreme temperatures, reactive concentrations, or durations, are preferable.

Example 10

Figure 10:
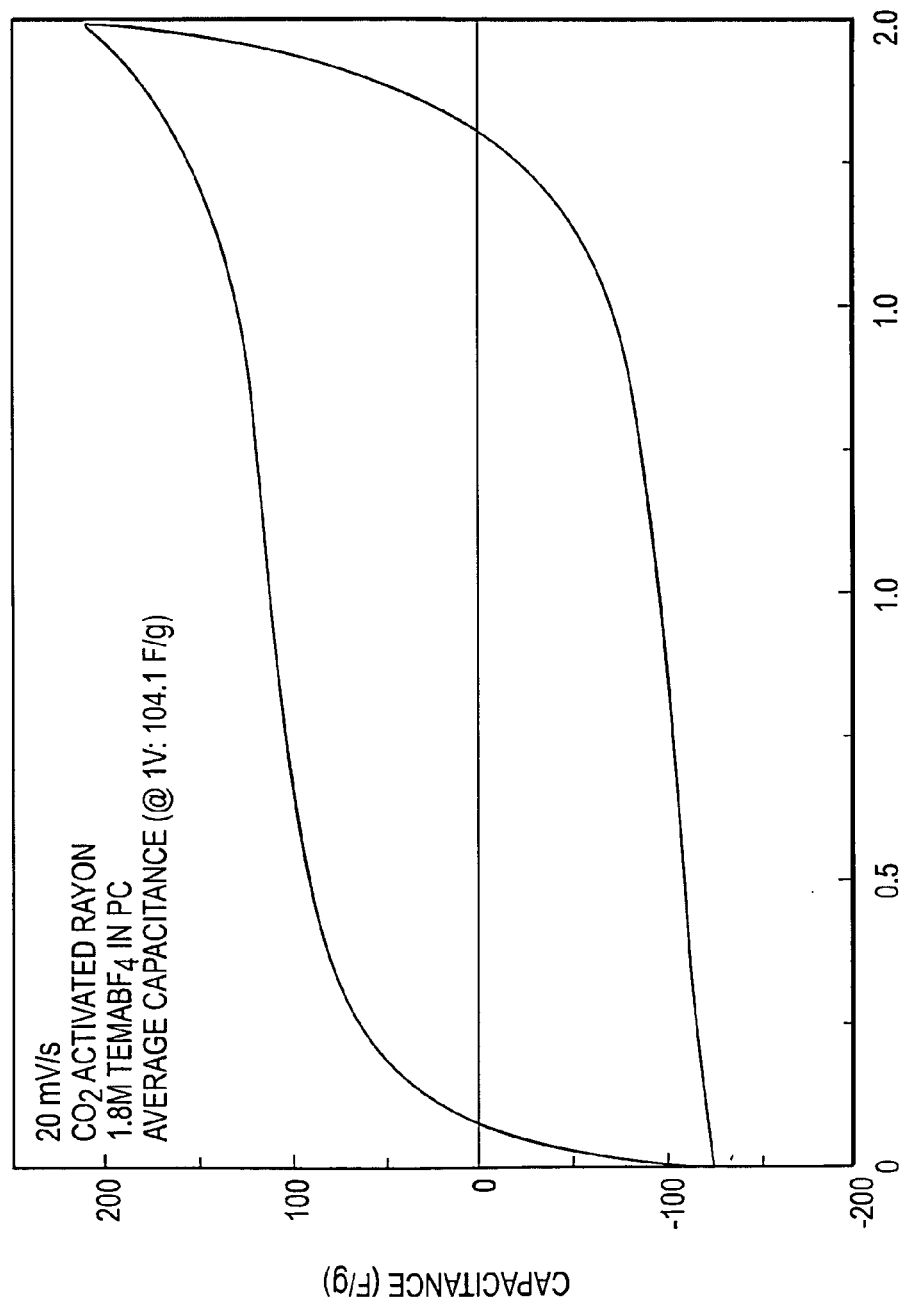
FIG. 10 is a graph showing a cyclic voltammogram of sequentially activated carbons.

In another experiment, green Rayon (obtained from North American Rayon Corporation, Elizabethton, Tenn.) was soaked in 5% (NH4)2HPO4, and simultaneously carbonized and phosphorous activated @ 850° C. for 60 minutes. The material was then activated physically in a second activation process with $CO_2$ (500 ml/min) 800° C., 60 minutes. The resulting material had an average capacitance at 1 V of 104.1 F/g. A CV for the material of Example 10 is shown at FIG. 10.

Milling of Activated Carbons

In one embodiment, an enhancement to a method for preparing activated carbons involves milling before final activation in order to preserve the rugosity of the subsequently activated carbon. Milling activated carbons is detrimental to rugosity and, thus, exterior surface. Conventionally, bulk carbon precursors or large carbon particles are activated and afterwards ground or milled to a final particle size distribution. See for example Norit Nederland B. V. (largest supplier based in Europe) presentation at 95, and MeadWestvaco (MWV) (largest supplier based in the U.S.) presentation at 141, both in Proceedings of $16^{th}$ ISDLC (2006). It is simpler and cheaper to carbonize and activate (for example wood sawdust) in one continuous high temperature process and then mill to a final particle distribution, rather than carbonize, (cool), mill, (heat) then activate. See also the alkali activation procedure in U.S. Pat. No. 7,214,646 (describing both pre- and post-activation milling). Thus, under conventional thinking, milling before activation is disadvantageous at least because it requires additional time and energy costs, and because conventionally it is thought that only interior pore surface is important while exterior surface is not.

One shortcoming of milling activated carbons is that milling essentially destroys activation rugosity. The resulting milled fragments of the original larger particles have primarily cleavage surfaces. Cleavage surfaces have the morphology of the interior of the activated carbon on a mainly microporous scale. Rugosity from activation is thus lost by milling after activation. The following experiments demonstrate the loss of rugosity in the conventional method, and by contrast the utility of milling the precursor prior to activation in one embodiment.

Figure 11:
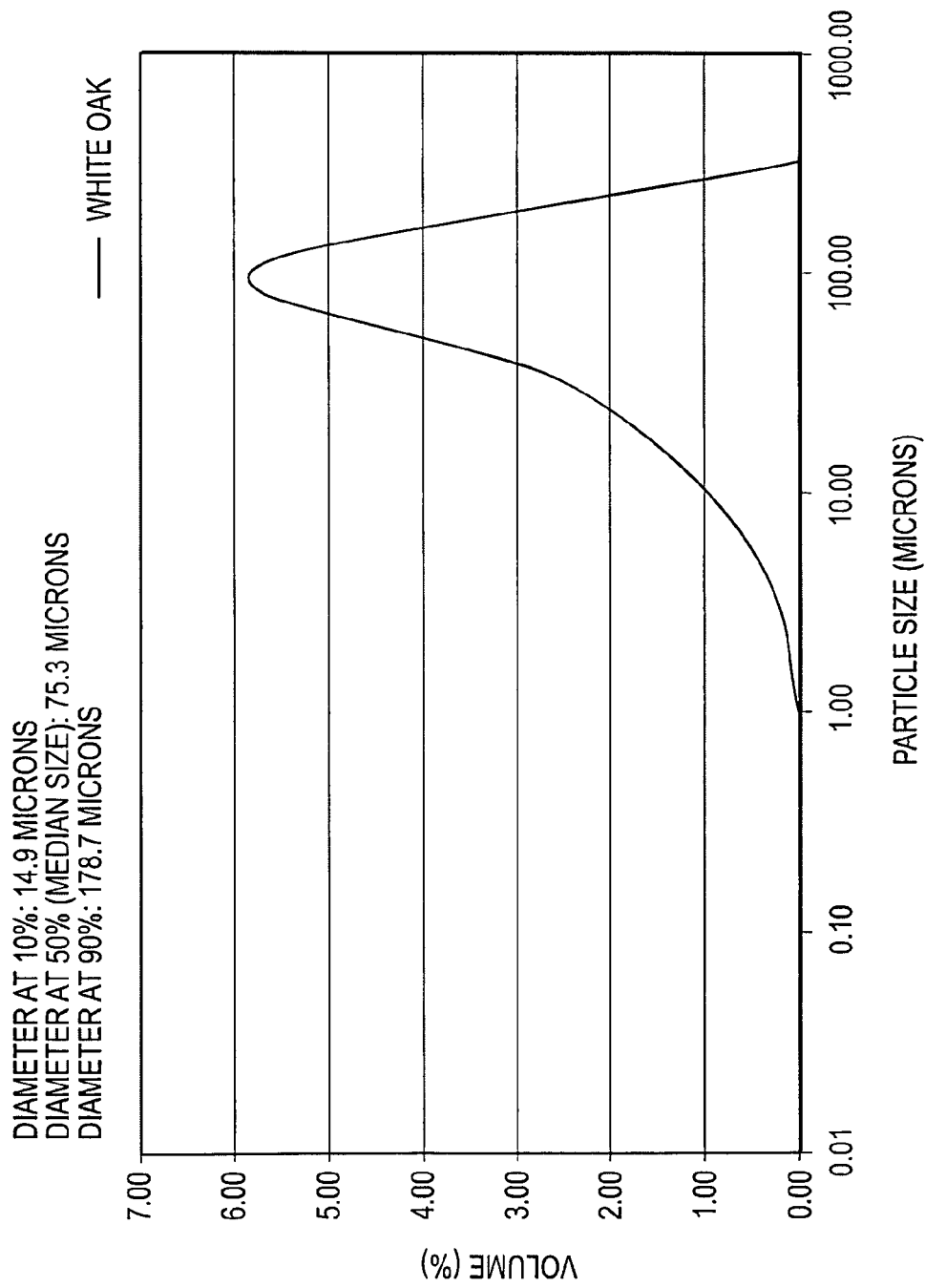
FIG. 11 is a graph showing the particle size distribution of activated carbon prior to milling.

In one experiment, phosphoric acid activated hardwood (white oak) was ground to a $D_{50}$ of 75.3 microns resulting in a particle size distribution shown in the graph of FIG. 11. This large particle activated carbon had a BET surface of 1396 $m^2/g$, and a DFT total pore volume of 1.053 cc/g, of which 69.3% was mesopore. Pore volume and percents were measured using DFT on a Micromeretics ASAP 2010. This material was made into a double layer capacitor cell using 1.8 molar TEMA/PC electrolyte. Specific capacitance of the functional two-electrode capacitor device, measured using a 20 mV/s sweep rate at up to 2.0 volts, was only 58.5 F/g despite the high mesoporosity.

Figure 12:
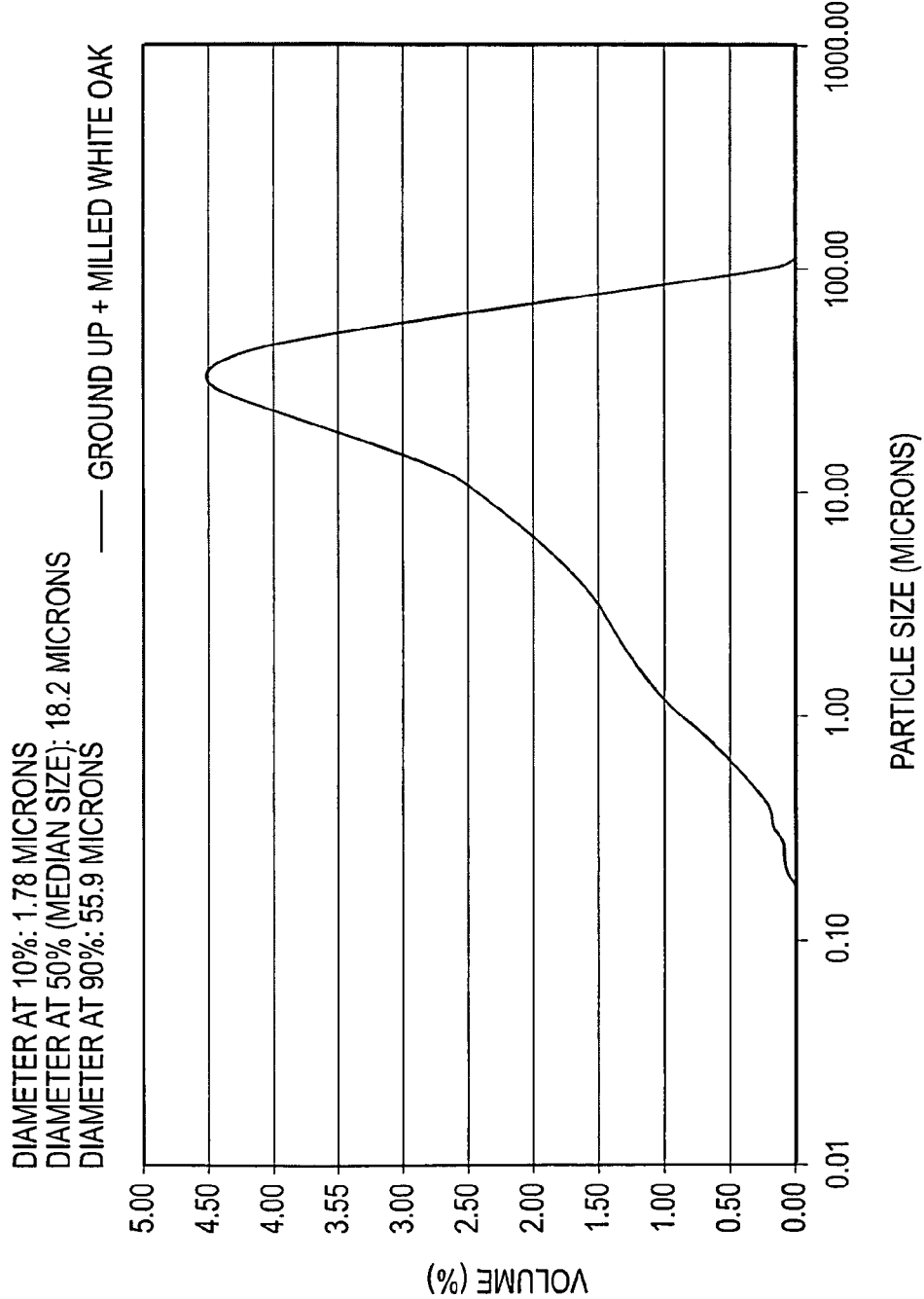
FIG. 12 is a graph showing the particle size distribution of activated carbon prior after milling.

These particles are rugose, but are undesirably larger than conventional electrocarbons. Therefore, as done with other activated carbons, and in accordance with the convention of the prior art, the phosphoric acid activated material with a $D_{50}$ of 75 microns was subsequently (ball) milled to a median particle size of 18.2 microns. The resulting particle size distribution after the milling is shown in the graph of FIG. 12. Specific capacitance of the functional two-electrode capacitor device, measured using a 20 mV/s sweep rate at up to 2.0 volts, was only 59.2 F/g.

Figure 13:
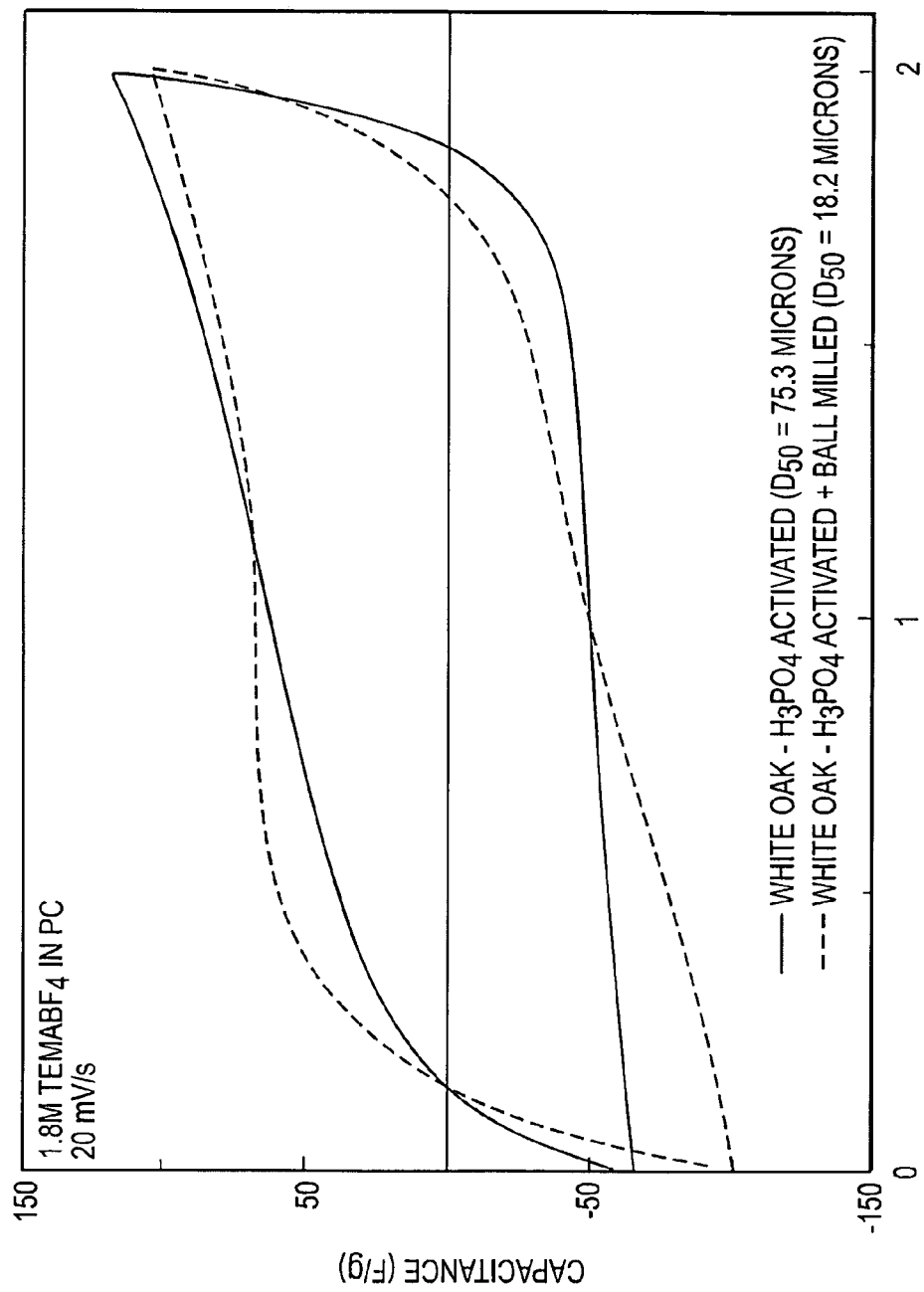
FIG. 13 is a graph showing a comparison of cyclic voltammograms between activated carbons before and after milling.

The median particle size of 18.2 microns would be expected to convey some of the surface/volume advantages of carbide-derived carbons, that is, a geometric increase in external surface for a given volume by virtue of smaller particle size. A comparison cyclic voltammograms (CVs) of working cells made from the phosphoric acid activated material with a $D_{50}$ of 75 microns and from the subsequently (ball) milled median particle size of 18.2 microns, shown at FIG. 13, reveals that capacitance is substantially unchanged. There is no substantial increase because milling essentially destroys activation rugosity. The smaller particle surface/volume gain was only able to compensate for the loss of activation rugosity. One of skill in the art of CV's would also recognize an increase in issues such as resistivity. This experiment demonstrates the shortcoming of the post-activation milling process.

The importance of activation rugosity suggests an improvement to the manufacturing process for electrocarbons. In one embodiment, to preserve activation rugosity from the shortcoming of the post-activation milling processes used to produce a final particle size distribution, milling should be done before and not after activation. Milling a carbon precursor to its approximate final size distribution prior to activation preserves the incremental specific capacitance arising from activation rugosity, while allowing the particle size distribution of the material to be tailored to the intended use. For example, for energy density, a finer median particle size with more surface but a higher ESR electrode may be selected, while for power density a larger median particle size with less ESR but also less electrode energy density may be selected.

As stated above, it is also known that fines (a product of the milling process) may result in higher equivalent series resistance (ESR) and lower device power density. Without wishing to be limited by theory, increase in cumulative grain boundary contact resistance and increase in mean ion path length due to more convoluted and tortuous electrode void structure (from fines in voids between particles) are conventionally thought to be mechanisms contributing to increased ESR. Therefore manufacturers like MeadWestvaco offer the option of sieved or air classified particle distributions that more tightly control the particle size distribution and eliminate fines. See for example, Proceedings of $16^{th}$ ISDLC: 141 (2006).

In one embodiment, the precursor carbon may come from any source of sufficient purity (either with or without an additional chemical purification step such as acid washing), including naturally occurring materials such as coals, plant matter (wood, coconut shell, food processing remainders (pulp, pith, bagasse), or sugars), various petroleum or coal tar pitches, specialized pitch precursors such as described by U.S. Pat. No. 6,660,583, or from synthetic polymeric materials such as polyacrylonitrile (PAN) or polyvinyldiene chloride (PVDC). The embodiments are not limited thereto but comprises any chemically suitable precursor capable of being carbonized, and activated.

Specific capacitance of a finished activated carbon depends in part on preserving activation-induced rugosity in the final electrode material. In one embodiment, a precursor material is first milled to a desired particle size. Only after milling is the precursor material activated. By milling before activation, rugosity is preserved. The following example illustrates the practical utility of the embodiment.

Example 11

Figure 14:
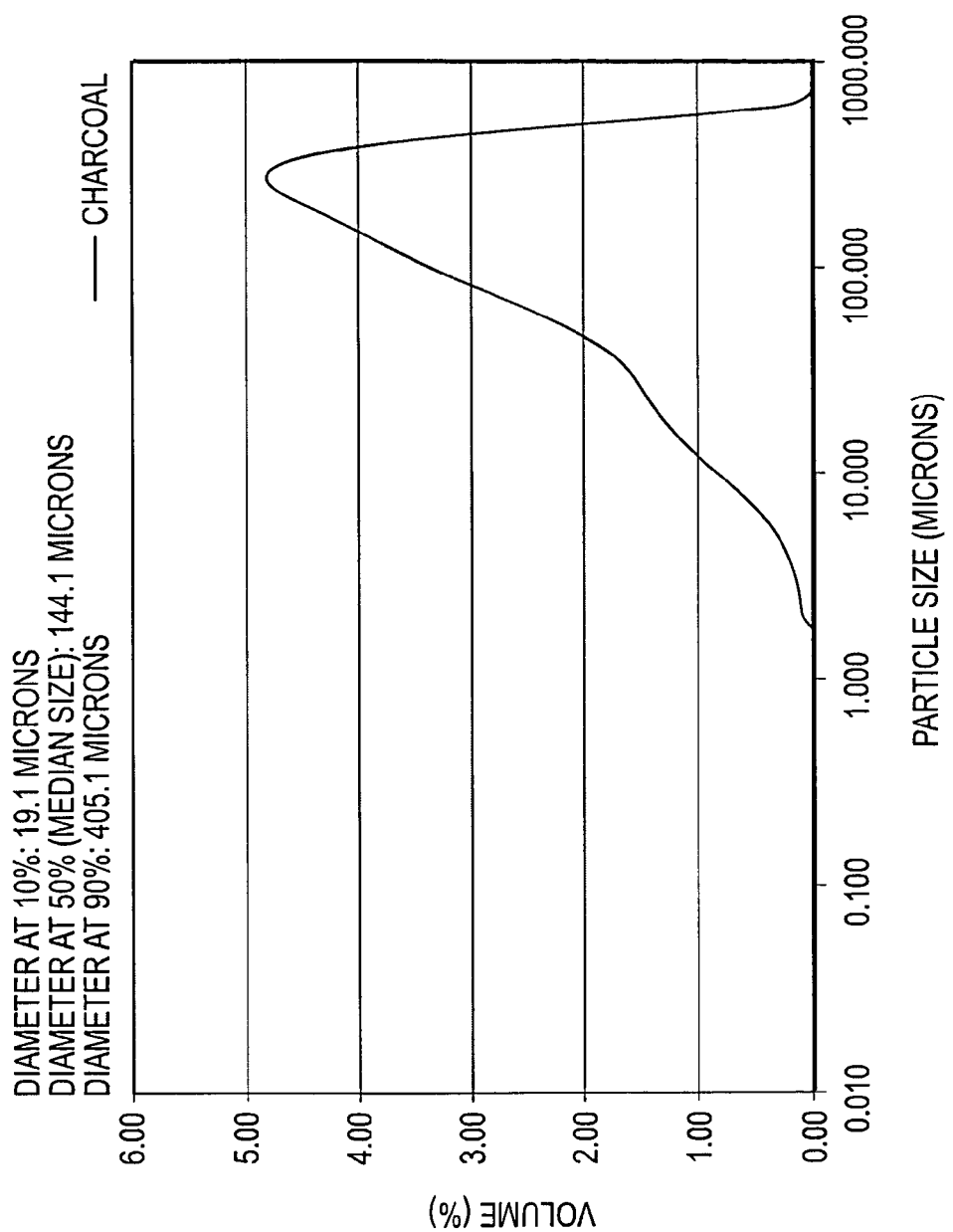
FIG. 14 is a graph showing the particle size distribution of carbon after being ground.

Hardwood charcoal was ground to a particle $D_{50}$ of about 144 microns as shown by the particle distribution of FIG. 14. In the example, Cowboy hardwood charcoal (Cowboy Charcoal, Co., Brentwood, Tenn.) was used; however, other readily available and inexpensive bulk precursor charcoal may also be used. The charcoal was then activated in standard 30% steam/$N_2$ at 700° C. for 1 hour resulting in a material with a BET surface of 790 $m^2/g$ and a total pore volume of 0.396 cc/g that was 63.8% micropore. Pore volume and percentage micropore and mesopore were measured using DFT on a Micromeretics ASAP 2010. This steam activated carbon was made into a capacitor cell using 1.8 molar TEMA/PC electrolyte. Specific capacitance of the functional cell, measured using a 20 mV/s sweep rate at up to 2.0 volts, was only 40.9 F/g. The result is to be expected because of the relatively low BET surface, low total pore volume, high micropore proportion, and disadvantageously large median particle size.

Example 12

Figure 15:
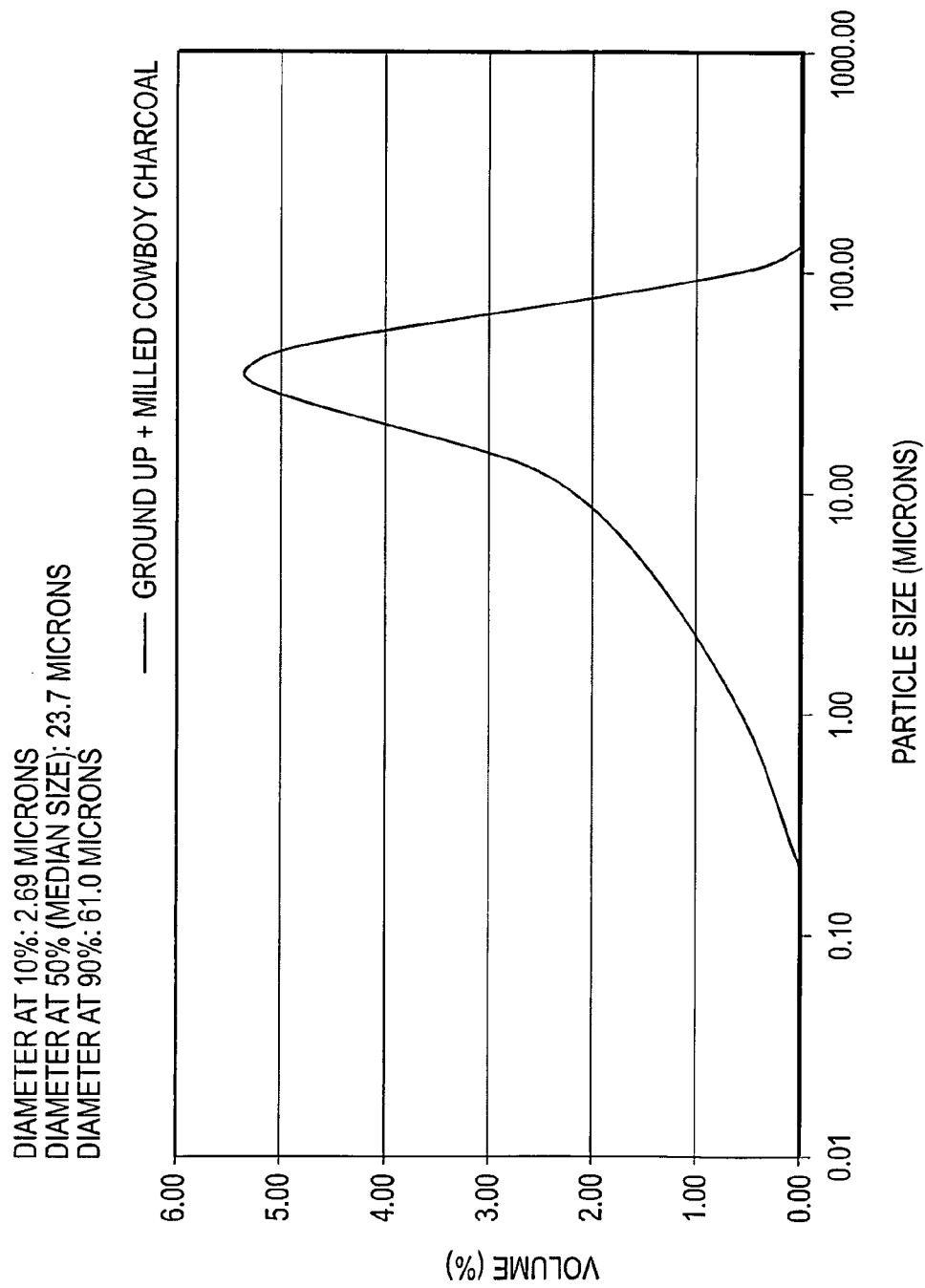
FIG. 15 is a graph showing the particle size distribution of carbon after being milled.
Figure 16:
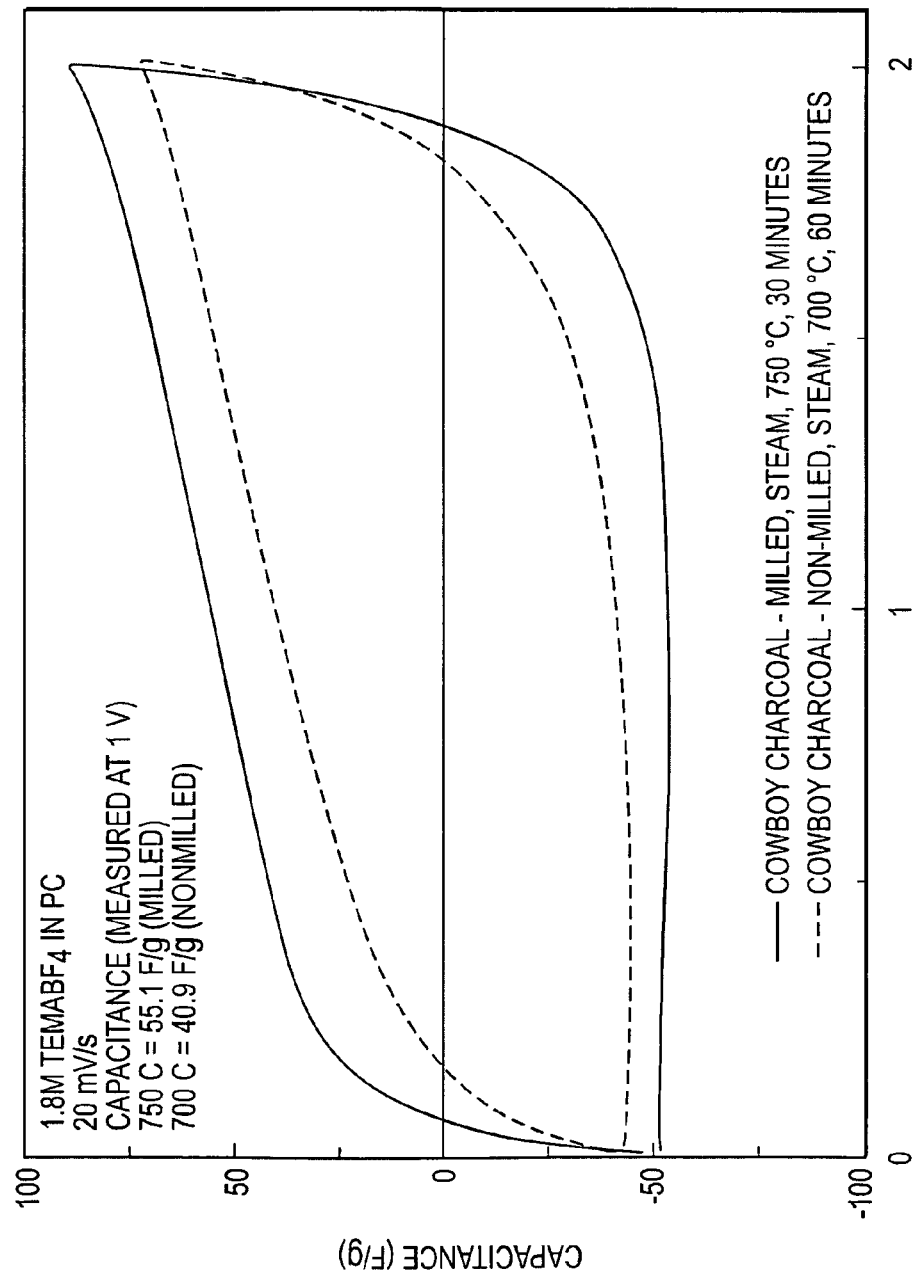
FIG. 16 is a graph showing a comparison between cyclic voltammograms of carbons of FIGS. 14 and 15 afteractivation.

The same precursor charcoal was then milled to a $D_{50}$ of about 24 microns prior to activation (still three times larger than conventional electrocarbon particulate) as shown by the particle distribution of FIG. 15. The milled charcoal was then steam activated at 750° C. for only 30 minutes. The resulting BET surface was 738 $m^2/g$, with a total pore volume of 0.455 cc/g and 48.1% micropore. The resulting BET surface is 52 $m^2/g$ less BET than the larger particles that were activated for 1 hour (twice as long). In an equivalent capacitor cell this carbon had a specific capacitance of 55.1 F/g. This example illustrates the advantage of reduction in particle size prior to activation. Capacitance is increased by more than a third while activation time is decreased by half and temperature is increased only marginally. The utility of milling before activation in this embodiment is clearly demonstrated by comparing the CVs shown in the graph of FIG. 16 for the two working devices of the examples.

Controlling Mesoporosity

In one embodiment, an enhancement to a method for preparing activated carbons involves improving the rugosity of activated carbons through the use of catalytic nanoparticles in an activation process. Nanoparticle catalyzed mesopore formation in carbons, and thus, carbon mesoporosity, may be controlled by varying carbon activation processes in the presence of catalytic nanoparticles.

Metallic/metal oxide nanoparticles formed by general solvent coating methods using organometallic precursors followed by thermal decomposition into nanoparticles produced substantially varying average catalyzed pore depths and diameters depending on the metal and the activation conditions. One skilled in the art would understand that coating of nanoparticles onto a carbon thus can include coating the carbon with organometallic precursors. Two different metal/metal oxide nanoparticle activations illustrate this difference using unactivated but fully carbonized KYNOL fiber precursor (available from American Kynol, Inc., Pleasantville, N.Y.) averaging about 13 microns in diameter. Nanoparticles of both iron and nickel were formed by solvent deposition of 0.25% (metal:carbon weight) metal acetylacetonate dissolved in tetrahydrofuran, followed by evaporation of the solvent and then initial metal oxide nanoparticle and catalytic mesopore formation using a 1:1 ratio of air:nitrogen at 900° C. for 7 minutes. Nanoparticles of nickel and iron ranging from 40 nm to 60 nm on KYNOL were visible near the limit of resolution of the SEM instrument. These nanoparticles are larger than preferable, but are useful because they are imagable. The depth and diameter of the surface rugosity, including mesopores, caused by the nanoparticles under these conditions plainly varies as shown in the images in FIG. 17.

The nickel is less reactive, producing shallower and somewhat smaller diameter mesopore pits. For both nickel and iron, air activation differentially causes the nanoparticles to drill into the carbon, compared to steam activation that differentially activates the carbon mass as well as the catalytic nanoparticle "drilling." This is shown in FIG. 17, by comparing air to steam activation, and was measured by percentage carbon mass loss with the iron. 0.25% Fe(acac)$_3$ activated in 1:1 air:nitrogen at 800° C. for only 7 minutes resulted in 17.8% mass loss, while activation in 30% steam at 900° C. for 60 minutes resulted in only 8.3% mass loss.

A precursor carbon may come from any source of sufficient purity to be used as an electrocarbon (either with or without an additional chemical purification step such as acid washing), including naturally occurring materials such as coals, plant matter (wood, coconut shell, food processing remainders (pulp, pith, bagasse), or sugars), various petroleum or coal tar pitches, specialized pitch precursors such as described by U.S. Pat. No. 6,660,583, or from synthetic polymeric materials such as polyacrylonitrile (PAN) or polyvinyldiene chloride (PVDC). In one embodiment, rayon fabrics or fibers created using the viscose process may be utilized. In another embodiment, Tencel® fabrics or fibers created by the lyocell process may be utilized. The precursor may be chosen utilizing any of the methods or considerations described herein in other embodiments. The embodiments comprise any chemically suitable precursor capable of being carbonized, and activated.

In some embodiments, the nanoparticles have diameters of up to and including about 50 nm, in other embodiments, up to and including about 15 nm, in other embodiments, up to and including about 8 nm, in other embodiments, up to and including about 4 nm, and in other embodiments, about 2 nm. The preferred particle size mode will depend on the choice of electrolyte and the device requirements. For example power density may preferably require larger mesopores to reduce diffusion hindrance, at the expense of less total surface and lower energy density.

In some embodiments, the metal and/or metal oxide nanoparticles comprise iron, nickel, cobalt, titanium, ruthenium, osmium, rhodium, iridium, yttrium, palladium, or platinum, or combinations thereof, or alloys thereof. In other embodiments, the metal/oxide nanoparticles comprise nickel oxide. In yet other embodiments, the metal/oxide nanoparticles comprise iron oxide. In another embodiment, the nanoparticles comprise alloys of nickel and iron.

Carbon mesoporosity and total surface rugosity resulting from catalytic nanoparticle activation is a function of metal or metal oxide type (catalytic potency), nanoparticle size, nanoparticle loading (i.e. the coverage on the carbon, the number of nanoparticles per unit carbon exterior surface), carbon precursor, and carbon activation conditions such as temperature, etchant gas (i.e. steam or carbon dioxide or air) as a percentage of the neutral (i.e. nitrogen) atmosphere, and duration.

Two or more different activation regimes may therefore be employed to first drive the catalytic nanoparticles as deep as desired into the carbon particle or fiber, and then activate the carbon to produce both conventional activation rugosity via pitting and spalling on the greater carbon exterior surface created by the nanoparticles, and the conventional internal carbon activation porosity.

A practical example of the utility of this embodiment is illustrated by the following experimental examples. Two metal acetylacetonates, nickel and iron, were solvent coated at a concentration of 0.1% (metal:carbon by weight) onto commercial carbonized KYNOL fiber, and the solvent then evaporated. A first air activation introduced large mesopores catalytically etched by the nanoparticles. This is readily visible in images shown in FIG. 18. In these experiments, carbonized (~13 μm diameter) Kynol fiber is electrochemically anodized in mild $H_2SO_4$. The Kynol carbon fiber is then soaked in 0.1 wgt. % Ni(acac)$_2$/THF or Fe(acac)$_3$/THF solution for 10 minutes. The samples allowed to air dry at room temperature. The samples are then activated at 900° C. for 10 minutes under 1:1 air:$N_2$ flow, with a ramp to 900° C. at a rate of 10° C./minute, where the ramp up occurs under an $N_2$ purge. The samples are then allowed to convectively cool after activation. As shown in the foregoing example, the experimental variables may include the solvent wgt. % metal concentration, the solvent evaporation rate, the activation temperature, the ramp rate to reach the activation temperature, the duration of time spent at the activation temperature, and the air/nitrogen gas ratio utilized during activation.

This first activation uses air (or other oxygen containing gas) in combination with an inert gas to drill the nanoparticles into the carbon. Suitable inert gases include nitrogen, helium, argon, neon, krypton, xenon, and mixtures thereof. When air is used, the ration of air to inert gas is typically from 0.1:1 to 1:0.1, preferably 1:1. The time for this first activation will depend on the temperature and on the desired end surface and porosity. Higher temperatures require less time. One of skill in the art of etching would be familiar with appropriate times and temperatures. In general, the temperature of the first activation is between 700° C. and 1000° C., preferably 900° C. In general the activation is conducted for between 1 and 15 minutes, preferably 5-10 minutes. The mass loss of the fiber after this first activation is generally less than about 30%, preferably between about 20-30%.

Subsequent activation by steam or carbon dioxide further enhanced the total proximate exterior, interior carbon porosity, and total surface of the fiber. One of skill in the art of carbon activation would be familiar with appropriate times and temperatures to use in this second etching step. The enhanced proximate exterior is readily visible in the images shown in FIG. 19 (where steam activation was used). The mass loss of the fiber compared to the original carbon is generally greater than about 35%, preferably greater than about 40%, more preferably about 45%.

To further quantify experimentally the utility of the processes, comparative carbon mass losses indicate the relative amount of surface created by the eroded mass. The baseline mass loss for 0.1% nickel and iron nanoparticles formed by this specific means on carbonized KYNOL averaged 17.8% and 10.2% respectively, in 30% steam at 900° C. for 60 minutes. A first 1:1 air:nitrogen activation for 10 minutes at the same temperature resulted in 27.7% and 29.6% respectively. After a second steam activation following the air at the same temperature of 900° C., the total mass loss was 45.5% and 39.8% respectively. Although not exactly additive, these relative losses plainly show the successive contributions of the sequential activation steps, using the relative catalytic enhancement of the differing activity nanoparticles and differing activation conditions.

An example of the commercial utility of this embodiment is a double activation of an anthracite coal 'Minus 100' particulate powder averaging 4.7 micron particle diameter. The 'Minus 100' carbon powder was spray coated with 1.5% iron acetylacetonate dissolved in THF, then activated at 900° C. with 1:1 air:nitrogen for 10 minutes followed by steam activation for 20 minutes at 900° C. The catalytic nanoparticles formed in this experiment are smaller than the limit of resolution of the available SEM instrument. The BET surface of the material was only 760.3 $m^2/g$ and the total pore volume was only 0.30429 cc/g, both measured using a Micromeretics ASAP 2010. Specific capacitance of a functional two electrode capacitor device made from this material using 1.8 m TEMA/PC electrolyte was 100.0 F/g at 1 volt and about 108 F/g at 2 volts measured using a 20 mV/s sweep rate at up to 2.0 volts, with a cyclic voltammogram (CV) indicating pure double layer capacitance. That is comparable to commercial electrocarbons having 100% to 150% more BET surface (up to a nominal 2000 $m^2/g$). At 13.16 $\mu F/cm^2$, this carbon is about twice the normalized value of commercial MeadWestvaco electrocarbons (*reported at 5.14 $\mu F/cm^2$ to 7.11 $\mu F/cm^2$ by Walmet in the Proceedings of the 16$^{th}$ International Seminar on DLC at* 139-140) yet the total processing time was only 30 minutes.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A method of forming an activated carbon:
providing a carbon material which is either a carbon or a carbon precursor, wherein the carbon material is a fiber having a diameter that has a value in the range from about 7 microns to 20 microns;
coating the carbon material with nanoparticles;
if the carbon material is a carbon precursor, then the following processes are performed subsequent to the coating the carbon material with nanoparticles:
carbonizing the carbon material to form a carbonized material;
catalytically activating the carbonized material in air and an inert gas to form a catalytically activated carbon; wherein the mass of the catalytically activated carbon is lower than the mass of the carbon material; and
activating the catalytically activated carbon in steam or carbon dioxide to form an activated carbon; wherein the mass of the activated carbon is lower than the mass of the catalytically activated carbon and wherein the activated carbon is mesoporous; and
if the carbon material is not a carbon precursor, then the following processes are performed subsequent to the coating the carbon material with nanoparticles:
catalytically activating the carbon material in air and an inert gas to form a catalytically activated carbon; wherein the mass of the catalytically activated carbon is lower than the mass of the carbon material; and
activating the catalytically activated carbon in steam or carbon dioxide to form an activated carbon; wherein the mass of the activated carbon is lower than the mass of the catalytically activated carbon and wherein the activated carbon is mesoporous.

2. The method of claim 1 wherein the activated carbon has a specific capacitance of at least 50 F/g.

3. The method of claim 1 wherein the activated carbon has a specific capacitance of at least 80 F/g.

4. The method of claim 1, wherein the activated carbon is milled.

5. The method of claim 1, wherein the nanoparticles have sizes that are less than 60 nm.

6. The method of claim 1 wherein the nanoparticles comprise iron, nickel, cobalt, titanium, ruthenium, osmium, rhodium, iridium, yttrium, palladium platinum, or combinations thereof or alloys thereof.

7. The method of claim 1 wherein the nanoparticles comprise at least two different metal oxides.

8. The method of claim 7 wherein the nanoparticles comprise iron, nickel, cobalt, titanium, ruthenium, osmium, rhodium, iridium, yttrium, palladium platinum, or combinations thereof or alloys thereof.

9. The method of claim 1 wherein a percentage of mass lost by the carbon material after the catalytically activating is performed is less than about 30% when compared to an original mass of the carbon material.

10. The method of claim 1 wherein a percentage of mass lost by the carbon material after the activating is performed is greater than about 35% when compared to an original mass of the carbon material.

11. The method of claim 1 wherein the activating comprises activating using carbon dioxide activation.

12. The method of claim 1 wherein the carbon precursor is a reconstituted cellulose material.

13. The method of claim 12 wherein the reconstituted cellulose material is formed by a lyocell process.

14. The method of claim 12 wherein the reconstituted cellulose material is formed by a viscose rayon process.

15. A method of forming an activated carbon comprising applying a phosphorus based chemical solution to a lignocellulosic carbon precursor material to form an intermediate material;
   carbonizing the intermediate material to form a carbonized intermediate material, wherein the phosphorous based chemical present in the intermediate material aids in controlling the carbonizing the intermediate material;
   milling the intermediate material to a smaller size distribution; and
   subsequent to the milling, physically activating the carbonized intermediate material to form an activated carbon.

16. The method of claim 15 wherein the carbon precursor material is a lignocellulosic fiber.

17. The method of claim 15, wherein the activated carbon has a specific capacitance of at least 80 F/g.

18. The method of claim 15, wherein the lignocellulosic carbon precursor material is green.

19. The method of claim 18 wherein the physically activating and the carbonizing process are concurrent for at least a portion of the time.

20. The method of claim 15 wherein the phosphorous based chemical solution is diammonium phosphate.

21. The method of claim 15 wherein the activating comprises activating using carbon dioxide.

22. The method of claims 15 wherein the lignocellulosic carbon precursor is a reconstituted cellulose material.

23. The method of claim 22 wherein the reconstituted cellulose material is formed by a lyocell process.

24. The method of claim 22 wherein the reconstituted cellulose material is formed by a viscose rayon process.

25. The method of claim 15, wherein the physically activating the carbonized intermediate material comprises applying to the carbonized intermediate material an etchant gas selected from the group consisting of steam and carbon dioxide.

26. The method of claim 25, wherein capacitance of the activated carbon, when milled, made into electrodes and tested for capacitance, is such that a parallelogram shape of a plot of capacitance versus voltage shows substantially constant discharge capacitance across voltage.

27. A method of forming an activated carbon comprising applying a phosphorus based chemical solution to a lignocellulosic carbon precursor material to form an intermediate material;
   carbonizing the intermediate material to form a carbonized intermediate material, wherein the phosphorous based chemical present in the intermediate material aids in controlling the carbonizing the intermediate material;
   physically activating the carbonized intermediate material to form an activated carbon; and
   milling the activated carbon.

* * * * *